(12) United States Patent
Ogawa

(10) Patent No.: US 6,772,421 B2
(45) Date of Patent: Aug. 3, 2004

(54) INFORMATION PROCESSING APPARATUS AND METHOD THEREFOR OF BINDING COMMON DATA BETWEEN PROCESSES BASED ON COMMON DATA SEARCH RESULTS, AND RECORDING MEDIUM

(75) Inventor: Takeshi Ogawa, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/213,738

(22) Filed: Aug. 6, 2002

(65) Prior Publication Data

US 2002/0194423 A1 Dec. 19, 2002

Related U.S. Application Data

(62) Division of application No. 09/605,670, filed on Jun. 28, 2000, now Pat. No. 6,470,413, which is a division of application No. 08/897,546, filed on Jul. 21, 1997, now Pat. No. 6,115,799.

(30) Foreign Application Priority Data

Jul. 19, 1996 (JP) .............................................. 8-190808

(51) Int. Cl.$^7$ ............................. G06F 9/00; G06F 12/00
(52) U.S. Cl. ........................ 719/331; 719/332; 711/170
(58) Field of Search ................................ 709/331, 332; 711/170; 719/331, 332

(56) References Cited

U.S. PATENT DOCUMENTS

| | | | | |
|---|---|---|---|---|
| 5,247,681 A | * | 9/1993 | Janis et al. | 719/331 |
| 5,802,368 A | * | 9/1998 | Grigsby et al. | 719/331 |
| 5,835,749 A | * | 11/1998 | Cobb | 719/331 |
| 6,332,168 B1 | * | 12/2001 | House et al. | 719/331 |

* cited by examiner

Primary Examiner—Glenn Gossage
(74) Attorney, Agent, or Firm—Fitzpatrick, Cella, Harper & Scinto

(57) ABSTRACT

An information processing apparatus, in which binding of data common to processes is performed such that common data is registered, and in which if it is determined that common data is not yet been registered, a task is shifted to a sleeping state and then shifted to an executable state once the common data is determined to be registered.

6 Claims, 35 Drawing Sheets

FIG. 2
(1) INITIAL STATUS
| FREE |
|------|
↑ALLOCATION POINTER
(2) REQUEST FOR MEM A
↑ALLOCATION POINTER
(3) REQUEST FOR MEM B
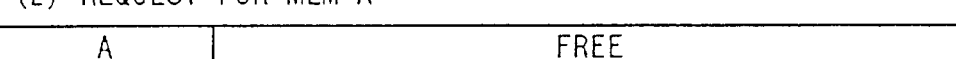
↑ALLOCATION POINTER
(4) RELEASE OF MEM A
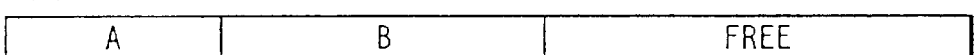
↑ALLOCATION POINTER
(5) REQUEST FOR MEM C
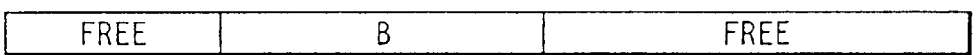
↑ALLOCATION POINTER
(6) REQUEST FOR MEM B
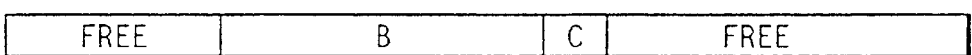
↑ALLOCATION POINTER
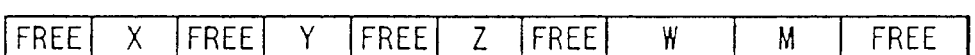
SIZE OF MEM B

| FIG. 3A | FIG. 3B |

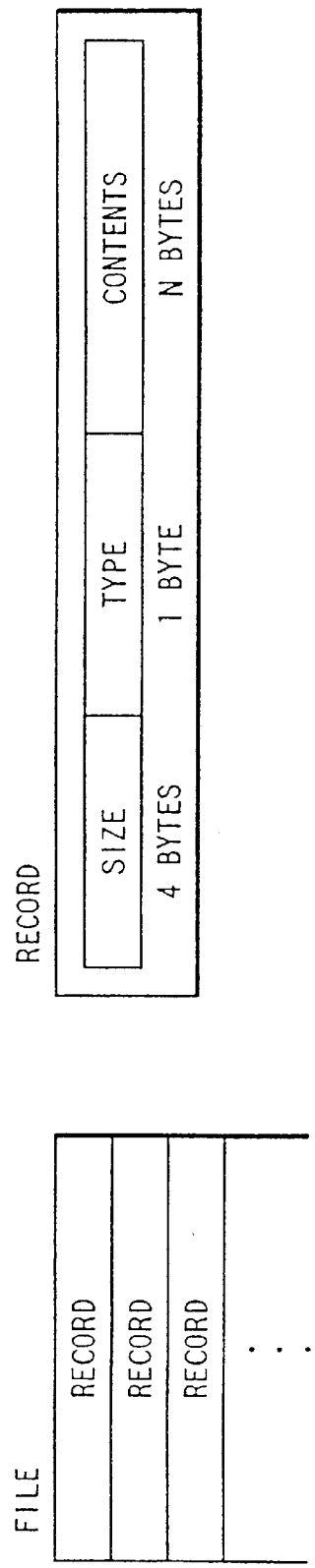

FIG. 13

| FORMAT | MEANING |
|---|---|
| CPU = XXXX | CPU TYPE OF OBJECT. LOADER PROGRAM SKIPS RECORDS UNTIL THIS FIELD COINCIDES WITH ITS OWN SYSTEM. TASK FILE TO BE EXECUTED IN NATIVE CODE MAY NOT BE OMITTED. |
| OS. VERSION = xx.xx.xx.xx | VERSION OF PLATFORM ASSUMED BY PROGRAM. OMISSION INHIBITED. |
| RC. NAME = xxxx | NAME OF RESOURCE COMPILER |
| RC. VERSION = xx.xx.xx.xx | VERSION OF RESOURCE COMPILER |

FIG. 28

FATAL ERROR

| NAME | MS WORD | RECOVERY |
|---|---|---|
| ABORT | 0 × 0001???? | DISPLAY ERROR CODE. INTERMIT PHOTOGRAPHING AND RECORDING. |
| INIT_DB | 0 × 0002???? | DISPLAY ERROR CODE. GET NO. OF FREE BLOCKS AND DIRECTORY INFORMATION AGAIN. |
| INIT_SYS | 0 × 0003???? | INSTRUCT USER TO COMPLETELY INITIALIZE CAMERA |
| ASSERT | 0 × 0004???? | EJECT DEBUG INFORMATION LOG AND ENTER ANALYSIS MODE |

INFORMATION PROCESSING APPARATUS AND METHOD THEREFOR OF BINDING COMMON DATA BETWEEN PROCESSES BASED ON COMMON DATA SEARCH RESULTS, AND RECORDING MEDIUM

CROSS-REFERENCE TO RELATED APPLICATION

This application is a division of application Ser. No. 09/605,670, filed Jun. 28, 2000, now U.S. Patent No. 6,470,413, which is a division of application Ser. No. 08/897,546, filed Jul. 21, 1997, now U.S. Pat. No. 6,115,799.

BACKGROUND OF THE INVENTION

1. Field of the Invention

The present invention relates to an information processing apparatus to which an arbitrary function can be added, and to a method therefor.

2. Related Background Art

For conventional camera systems, the relationship between the purpose for which memory is employed and addresses is ordinarily determined when compiling and linking is performed, and memory managers are therefore not mounted. When a camera system on which a memory manager is mounted for dynamically allocating memory is compared with a conventional camera system, it is found that the camera system on which the memory manager is mounted has included certain features that are described below.

Whereas when no memory manager is mounted, memory that is to be used for an additional program must be reserved in advance because the version of a program stored in the ROM in a camera and the location of the memory depend greatly on each other, and a small reserved area for an additional program must be set aside to ensure compatibility; when a memory manager is employed, in order for the memory to be fully utilized, the maximum memory area to be used at any one time need only be so set that it does not exceed the physical memory capacity. Memory management methods for a system having no virtual storage include a method for using a bit map and a method for using a variable length memory that is divided into memory management blocks. Since for the method involving the use of a bit map time must be allocated for searching for free memory having a required size, this method is infrequently employed for actual computer systems. As for the method for dividing a memory having a variable length, there are three well known methods: the Best Fit method, the First Fit method and the Next Fit method. Although the feature of the Best Fit method is that large continuous areas are constantly ensured, the allocation speed is reduced in proportion to the number of memory blocks. This property is shared by the First Fit method. Although according to the Next Fit method fast allocation can be performed regardless of the number of blocks, the fragmentation of free memory can occur. In image processing using a digital camera, since an image for one screen is divided into one thousand blocks, low allocation speed has a fatal effect on the processing speed of a camera. In addition, unlike a camera that uses conventional film, a digital camera that employs a hard disk having a large capacity and an alternating current ("AC") power source is capable of taking several tens of thousands of sequential shots, which is a durable shutter count, so that a failure of allocation due to fragmentation of memory is not allowed. The allocation of memory performed by the Next Fit method and the fragmentation of memory will be further explained.

In (1) of FIG. 2 is shown the initial state of a Next Fit memory manager. The main memory is managed as one free memory block, and an allocation pointer is set at the head. The block includes the formation types shown in FIG. 4: the size of a block, a flag indicating whether the block is free memory or whether it is in use, and a user application portion. When the entire memory is to be allocated while employing a 4-byte alignment, the block size need only be a multiple of four, and the remaining least significant bit can be used as a use flag. The block size can be employed to ascertain the head position of a succeeding block. The portion wherein information, such as the block size and the use flag, is stored is called an MCB (memory control block).

In (2) of FIG. 2 is shown the status when memory block A is requested by an application and is allocated. The memory is divided into one free block and one used memory block, while the allocation pointer is set so that it points to the head of the free memory division. In (3) of FIG. 2 is shown the status when memory block B is requested by the application and is allocated. The free memory is further divided for memory block B, and the main memory is, therefore, broken into three blocks. In (4) of FIG. 2, memory block A is no longer required and is released. Although the portion allocated to memory block A is now a free block, the position of the allocation pointer is not updated. When memory block C is requested in (5) of FIG. 2, the position that was previously occupied by memory block A is not used. When the memory size that is requested is larger than the free memory pointed to by the allocation pointer, a search for free memory is begun at the position of the allocation pointer. When a free memory block that is larger than the requested size is found, that memory block is divided and allocated. The allocation and the release of memory are repeated in the above described manner until a state such as is shown in (6) of FIG. 2 results. The status shown in (6) of FIG. 2 illustrates an allocation failure that occurred because the maximum size of each of the continuous memory blocks was smaller than the size of the area requested for memory B, even though the amount of free memory available was greater than that required for memory B. As a result, it is difficult to employ the Next Fit method for an application where the allocation and the release of memory are endlessly repeated.

A memory manager according to the present invention considerably reduces the effect of the above described problem, and enables an application to take advantage of memory management so that the memory can be utilized, for example, in a digital camera field. When memory is reallocated after fragmentation has occurred, the maximum continuous area size is increased. However, when the reallocation of memory is performed while the system is in use, much of the time a central processing unit ("CPU") is in operation will be spent in transferring memory. To avoid the fragmentation of memory when building a camera system, the system can be restarted whenever a predetermined period of time has elapsed. As was previously described above, however, continuous operation is a very important specification for a digital camera. Even when a technique of restarting the camera is not used, there is a time in a system when the amount of memory used is extremely small, and the system can utilize that time. If an extreme reduction of the amount of memory used always occurs at a specific time, the allocation pointer will be moved to the head of the main memory in consonance with that timing, much like the restarting of the memory manager. While the technical development cycle for personal computers is short, new image formats appear regularly. The internal structure of the digital camera is being computerized, and the processing range within which software is used is also being extended. Therefore, as with the personal computer, software is being added to the digital camera to expand its operation, so that the investment in hardware development is limited and the digital camera system can catch up with the rapid technical development cycle. The software for a digital camera, however, varies and includes software prepared for communication and for file systems, and it is difficult to predict which digital camera features and functionality will be significant in the future and which techniques will commonly be applied. Since various lots of digital cameras are sold on the market, additional extension software must be so designed that it can coexist with internally incorporated software of any lot. The present invention relates to a technique whereby an arbitrary digital camera functionality can be replaced and extended by software that is added later.

SUMMARY OF THE INVENTION

According to one embodiment of the present invention, provided is an information processing apparatus that has a function for managing memory using the Next Fit method and for reducing a problem associated with the fragmentation of memory.

The other purposes and features of the present invention will become apparent while referring to the following specification and drawings.

BRIEF DESCRIPTION OF THE DRAWINGS

FIG. 2 is an explanatory diagram for a memory manager;

FIG. 10 is a diagram showing a file format;

FIG. 11 is a diagram for explaining record types;

FIG. 13 is a diagram for explaining the form of a record;

FIG. 28 is a diagram showing types of FATAL ERRORs;

DETAILED DESCRIPTION OF THE PREFERRED EMBODIMENTS

Figure 1:
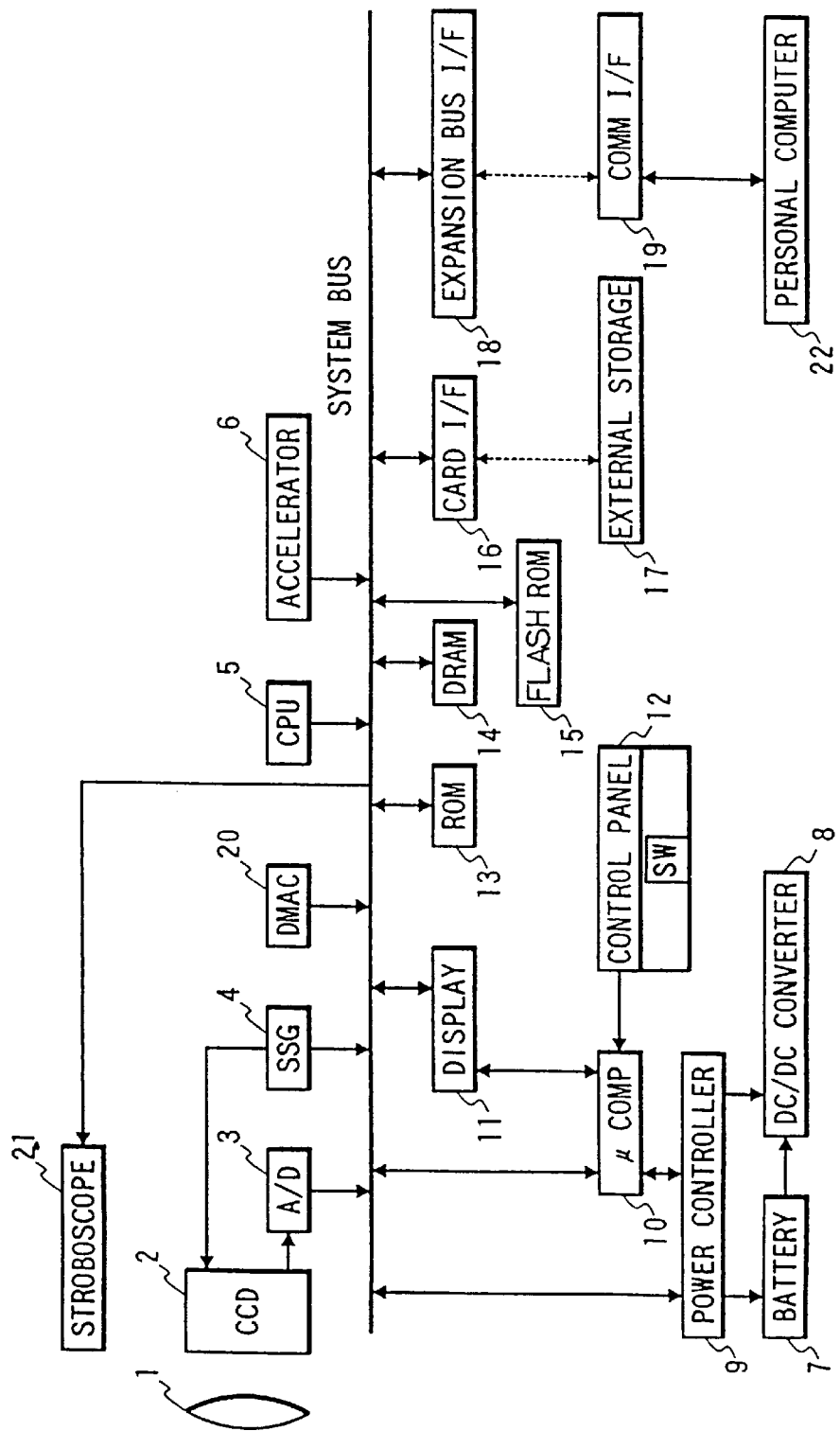
FIG. 1 is a block diagram of a camera system for explaining the present invention.

FIG. 1 is a block diagram illustrating a first embodiment of a camera system according to the present invention. A camera system comprises: a charge-coupled device ("CCD") unit 2 for outputting as an electric signal light that has passed through a lens 1; an analog-to-digital ("A/D") converter 3 for converting an analog signal from the CCD unit 2 into a digital signal; a sync signal generator ("SSG") unit 4 for supplying a sync signal to the CCD unit 2 and the A/D converter 3; a central processing unit (CPU) 5 of a camera system; an accelerator 6 for performing fast signal processing; a battery 7; a direct-current-to-direct-current ("DC/DC") converter 8 for supplying power to the entire system; a controller unit 9 for controlling the DC/DC converter 8; a microcomputer 10 for controlling a control panel, a display device and a power source; a display device 11 for displaying information for a user; a control panel 12, including a release switch ("SW") that is directly manipulated by a user; a Read-Only Memory ("ROM") 13, which is a storage medium wherein is stored a system program, such as an operating system ("OS"), or more specifically, a program, the procedures for which are shown in the accompanying drawings and will be described later, that is read and executed by the CPU 5; a dynamic random access memory ("DRAM 14"), which is the main storage device for the camera, wherein are stored data and the operational procedures that will be described later, and wherein is also stored a program, the procedures for which are read and executed by the CPU 5; a flash ROM 15, which is used as an incorporated storage medium in which are stored data and operational procedures that are read and executed by the CPU 5; an interface 16 for a Personal Computer Memory Card International Association ("PCMCIA") card; an external storage medium 17, such as an Advanced Technology Attachment ("ATA") hard disk; an expansion bus interface 18; a personal computer ("PC") communication interface (a COM, or parallel, I/F) 19; a direct memory access ("DMA") controller 20; a stroboscope 21; and a personal computer 22.

The photographic operation of this camera will be briefly described. When the release switch on the control panel 12 in FIG. 1 is depressed by a user, the CPU in FIG. 1 detects that depression and begins the photographic sequence. It is assumed that the entire succeeding operation is controlled by the CPU 5 in FIG. 1, and no explanation for it will be given. The SSG 4 in FIG. 1 drives the CCD 2. An analog signal output by the CCD 2 in FIG. 1 is converted into a digital signal by the AID converter 3. The output of the A/D converter 3 is transmitted to the DRAM 4 by the DMA controller 20. At the time the DMA transfer for one frame is completed, the CPU 5 begins a signal processing sequence. A signal processing program is obtained from the flash ROM 15 in FIG. 1 and is stored in the main memory, and is sequentially read and executed. The data in the main memory is transferred to the signal processing accelerator 6 to perform signal processing. The signal processing accelerator 6 does not perform all of the signal processing, but assists the CPU 5 in FIG. 1 by performing processing that requires an especially long period of time. The signal processing accelerator operates in cooperation with the processing software for the CPU 5. When one part, or all, of the signal processing has been completed, the data is recorded as an image file on the external storage medium 17. When the external storage medium 7 is not connected to the card interface 16, the resultant data is stored in the flash ROM 15. If a file format for recording requires compression, data compression is also performed. As is described above, in the first embodiment is shown an electronic camera for filing a photographic image on an external storage medium 17 or in a flash ROM 15.

A memory manager according to the present invention includes the Reset Allocation Pointer (ResetAllocationPointer) function, for moving an allocation pointer to the head of the main memory. When an application frequently calls the ResetAllocationPointer function, the memory manager uses a method similar to the to the First Fit method. If the ResetAllocationPointer function is called each time before an allocation is made, the system no longer is using the Next Fit method but using the complete First Fit method, and the time required for allocation will be increased in proportion to the amount of memory that is consumed. The original purpose of the ResetAllocationPointer is to set the memory manager to a state similar to that after a restart. The digital camera system calls this function immediately after one photographic operation, immediately after a recording operation, and immediately after a mode setup. By employing the above described structure, it is possible to build a digital camera system that provided both quick memory allocation and memory availability for sequential operations.

Figures 3, 3A:
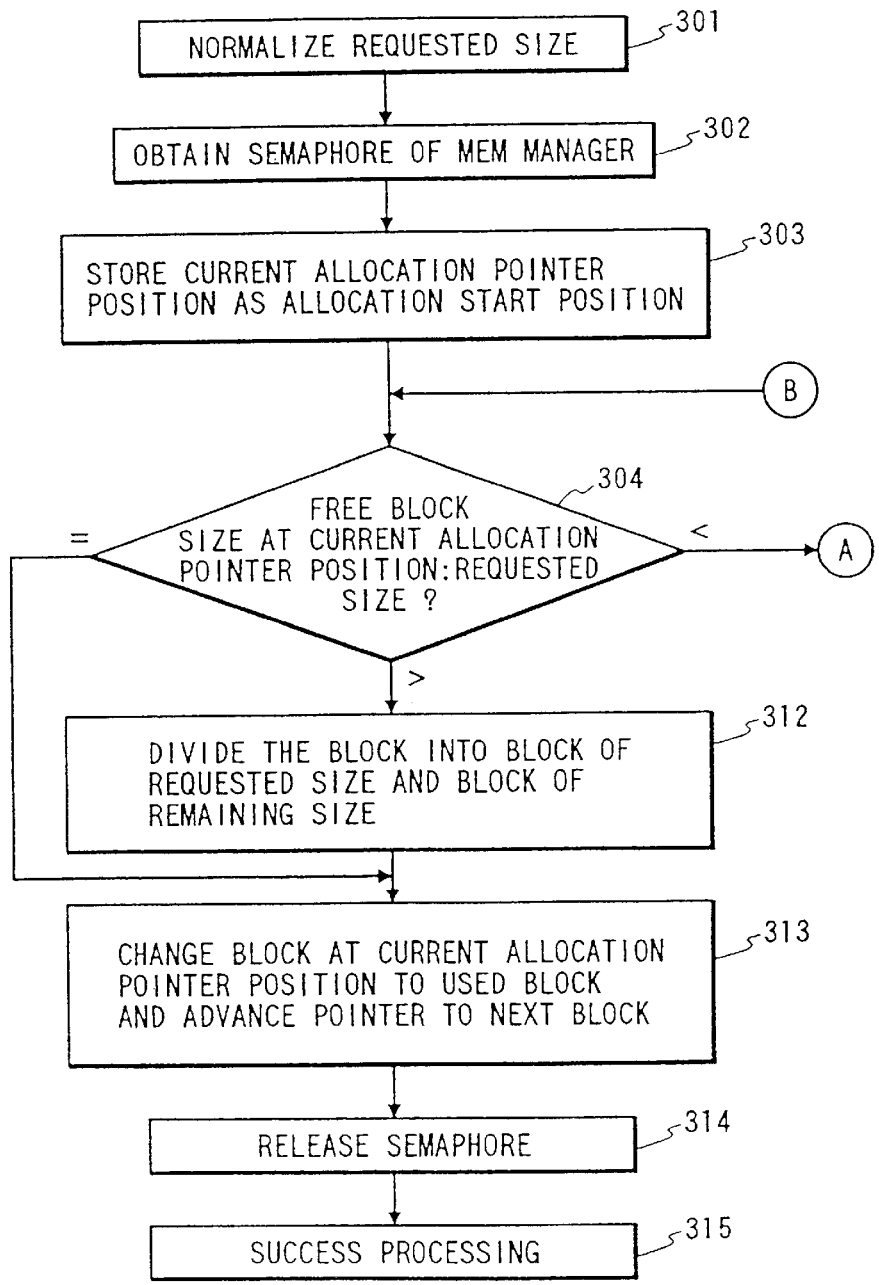
FIGS. 3, 3A and 3B together show a flowchart for explaining an allocation operation.
Figure 3B:
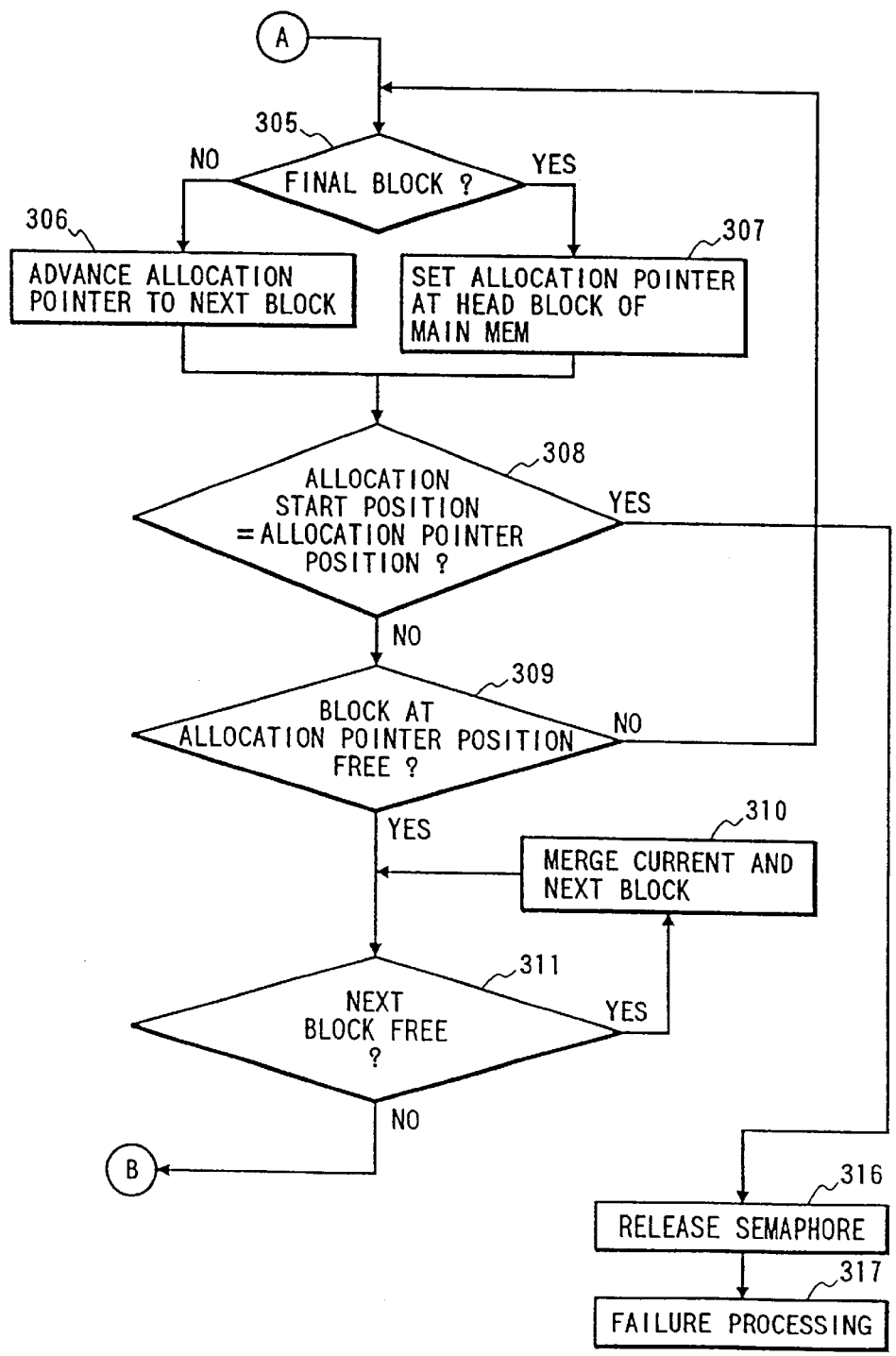
Figure 4:
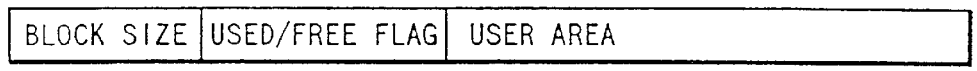
FIG. 4 is an explanatory diagram for a memory block.

FIGS. 3A and 3B are flowcharts for the allocation operation performed by the memory manager. The allocation operation will now be described while referring to the flowchart. A requested size is normalized at step 301 (FIG. 3A). While the memory size unit requested by an application program is one byte, the unit managed by the memory manager is larger because the memory size must be a 4-byte alignment unit in order for the memory manager to prepare the management information MCB header. At step 302, the semaphore for the memory manager is obtained. This is done because when one task involves the performance of an allocation operation while another task involves the performance of an allocation or a release operation, a double allocation and damage to an MCB may result. If an interrupt is inhibited for this reason, however, a control response by a digital camera for the control of a strobe and a shutter is adversely affected. Thus, exclusive control using the semaphore is performed. With the exclusive control provided by this method, the operation of the memory manager will not affect another task operation having a higher priority. At step 303, a current position for the allocation pointer is stored as an allocation start position. This pointer will be described later. At step 304, the requested size is compared with the free memory block size at the current allocation pointer position. When the requested size is greater, program control advances to step 305 (FIG. 3B). When the requested size and the free memory block size match, program control moves to step 313. When the requested size is smaller, program control goes to step 312. At step 305, a check is performed to determine whether or not the free memory block is the final block. If the memory block is not the final block, program control branches to step 307. Otherwise, at step 306, the allocation pointer advances to the next memory block. At step 307, the allocation pointer is set to the head or first block of the main memory. At steps 306 and 307, processing can advance to the next block. At step 308, the allocation start position stored at step 303 is compared with the allocation pointer position. When they match, it is assumed that all the memory blocks have been scanned, and the allocation fails. At step 316, the semaphore is released, and at step 317, an error value indicating that the acquisition of memory has failed is returned to permit program control to be returned to the application. When the allocation pointer position does not match the allocation start position, a check is performed, at step 309, to determine whether a memory block at the allocation pointer position is a free block.

When the block at the allocation pointer position is a block that is being used, program control returns to step 305. If not, program control moves to step 311. At step 311, a check is performed to determine whether or not the next memory block is a free block. When the next memory block is a free block, program control branches to step 310 (FIG. 3B). When the next memory block is not a free block, program control returns to step 304 (FIG. 3A), whereat the requested size is compared with the size of a block at the current allocation pointer position. At step 310, the next block and the block at the current allocation pointer position are merged to form one large memory block, and program control returns to step 311. This processing is repeated until all the sequential free blocks are merged. When, at step 304 (FIG. 3A), the requested block size matches the size of the memory at the current allocation pointer position, at step 313 the block at the current allocation pointer position is changed to a used memory block, which is the memory identified using steps 309 to 311 of FIG. 3B, and the allocation pointer is advanced to the next block. When, at step 304, the size of the free block at the current allocation pointer position is greater than the requested size, at step 312 the free memory block is divided into the a free block of the requested size and a free block of a remaining size, and program control then advances to step 313, discussed above. At step 314 the semaphore is released, and at step 315 the head address of the obtained memory is returned to the application program to return program control.

Figure 5:
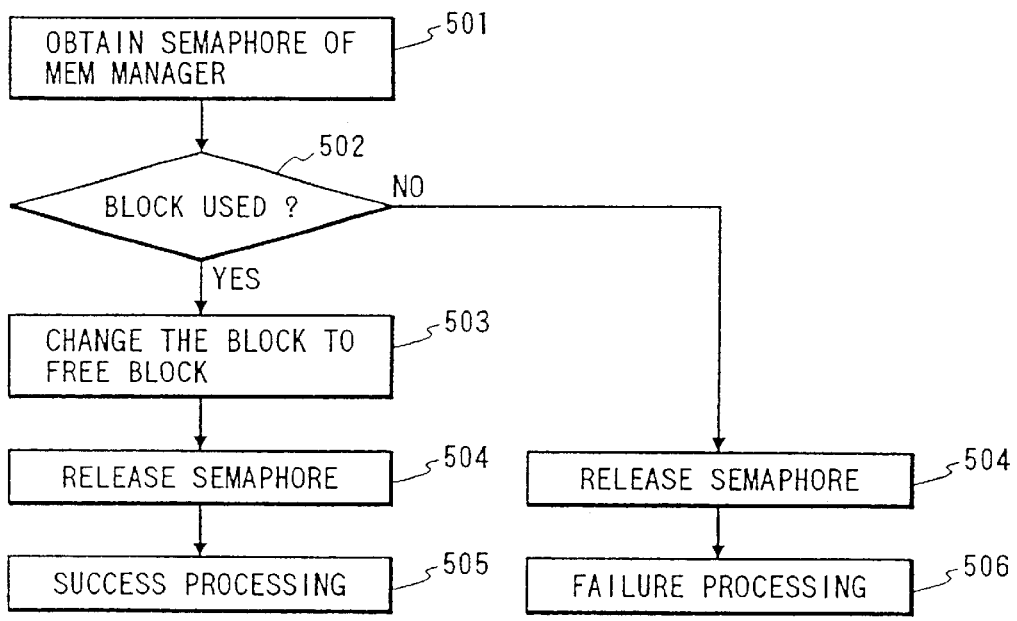
FIG. 5 is a flowchart for explaining a memory release operation.

FIG. 5 is a flowchart for the memory release processing performed by the memory manager. At step 501 the semaphore for the memory manager is obtained, and at step 502 a check is performed to determine whether a designated block is being used. When the designated block is not being used, at step 504 the semaphore is released, and at step 506 an error code indicating that the memory release failed is returned. Program control is thereafter returned to the application. When, at step 502, the designated block is being used, at step 503 the block is changed to a free block, at step 504 the semaphore is released, and at step 505 a return code indicating that the memory release was successfully accomplished is returned to permit program control to be returned to the application.

Figure 6:
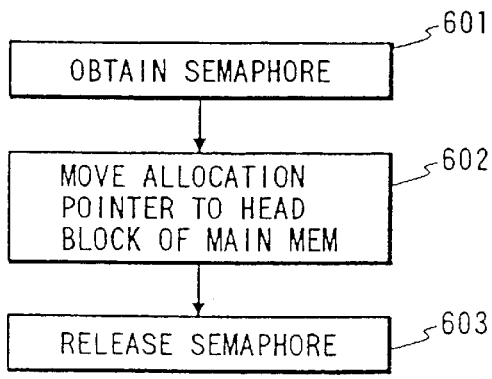
FIG. 6 is a flowchart for explaining an operation for a reset allocation pointer.

FIG. 6 is a flowchart for the ResetAllocationPointer operation. At step 601 the semaphore is obtained, at step 602 the allocation pointer is moved to the head or first block in the main memory, and at step 603, the semaphore is released.

<Program ROM Manager>

A digital camera stores an image using a file form that a computer can understand, but there are so many types of image files for computers that not all of them can be supported, and new image formats appear regularly. In this situation, a technique whereby a software feature can later be added to the camera or that provides the changing of the software function in the camera is important.

One part of the flash ROM 15 in FIG. 1 is employed to store firmware for the digital camera. If a part of a program can be changed or can be added, this is convenient for the development of firmware and for the upgrading of the firmware version for a camera. A program ROM manager that will be explained later provides a function for managing a program written in the flash ROM.

Figure 7:
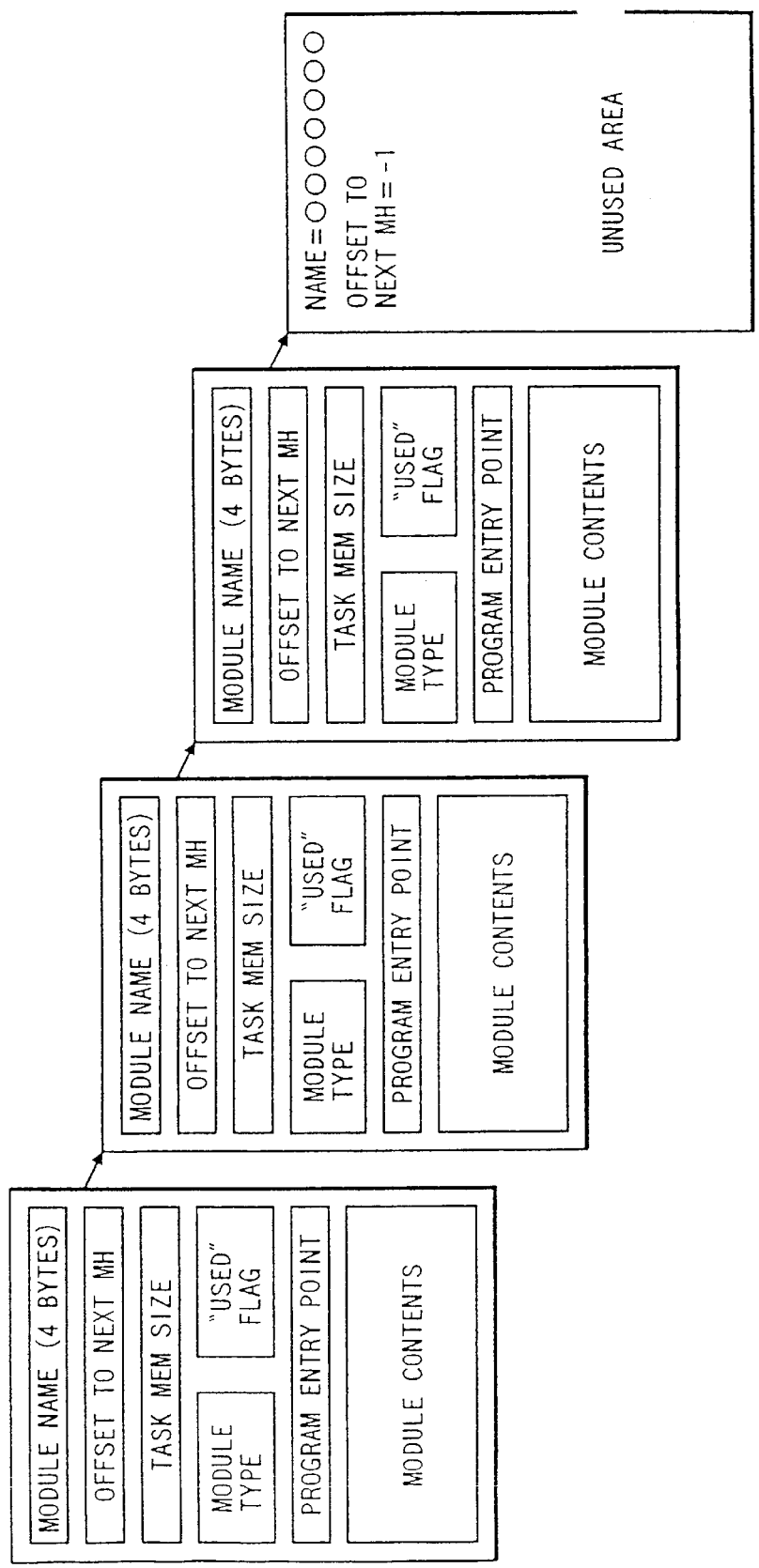
FIG. 7 is a diagram for explaining the form of a program stored in a ROM.

FIG. 7 is a diagram showing the form of a program stored in the flash ROM 15.

A stored program is managed as a unit module, and a management block called amodule header ("MH") is placed at the head of the module. In the module header are stored the module name, a program entry point and other information. Since data in the flash ROM 15 can not be erased as byte units, additional writing has to be performed to change a part of the module.

<Rewriting Module>

Figure 8:
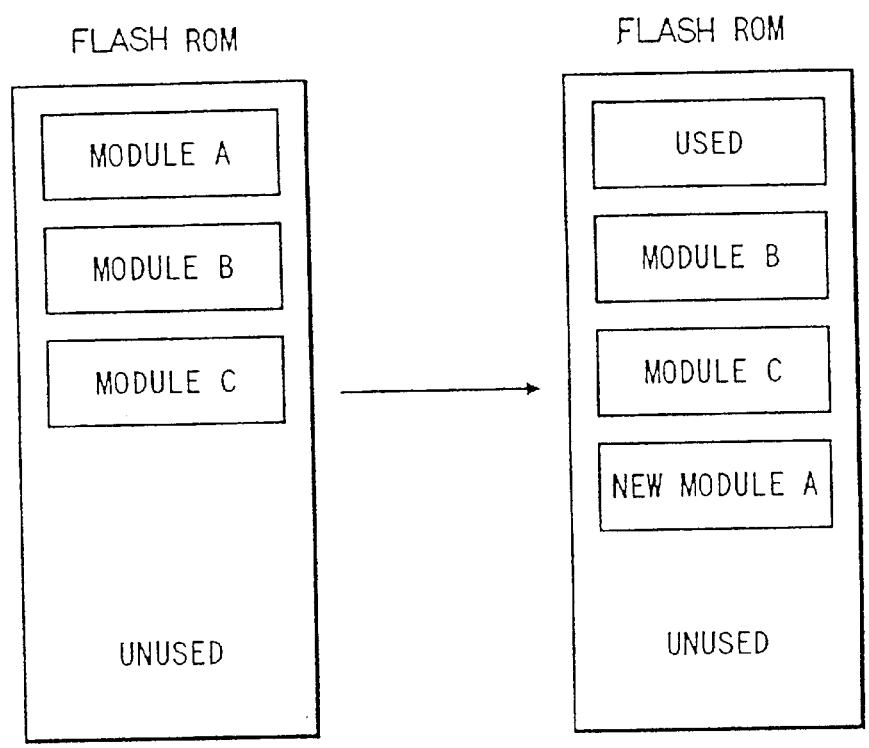
FIG. 8 is a diagram for explaining the rewriting of modules.

The writing of a module in the flash ROM 15 is performed from the head, as is subsequently described, while the erasing of a module is performed by rendering the module invalid. The rewriting of a module is performed by erasing the module and then writing a new module. At the left in FIG. 8 is shown the state where a plurality of modules exist in the flash ROM. At the right in FIG. 8 is shown the state where a module A has been newly rewritten. The original module A is a used module, and a new module A is written in an unused area.

The service performed by the program ROM manager is as follows:
(1) Designate a module name and obtain its address.
(2) Designate a file name and perform additional writing.
(3) Designate a module name and invalidate that module.
(4) Physically erase all of the programs in the flash ROM.

The program ROM manager uses as its sub-system the program loader function of an OS. At the time additional writing is performed, program code and a relocation table are read and are mapped to an address in the flash ROM where they are to be written. The technique whereby the code and relocation information are stored in an executable file in the program, and are mapped in the main memory for execution is a common technique in the personal computer field. However, since the mapping address in the flash ROM differs from the address in the main memory into which the program is loaded, writing to the flash ROM differs in that information must be transmitted via an Application Program Interface ("API"). The program loader in this embodiment supports mapping relative to a target address other than an address in the main memory to which the program is read. The program for physically writing to the flash ROM can not be located in the flash ROM. Since a technique called data polling is employed in a writing sequence for the flash ROM, during the writing only the same polling information can be read at any address in the flash ROM, and if the program being executed is located in the flash ROM, the next command will not be carried out correctly as soon as the writing is begun. Since almost all of the software for a digital camera is stored in the flash ROM, the above problem will occur when a task switch is turned on while writing is in progress. To resolve such a program, the program ROM manager of the present invention is so designed that it always executes a writing program in the main memory, and inhibits task SWs and interrupts during a period from the time the writing of one unit (a byte, a word or a double word) is begun until data polling is terminated. With this structure, the addition of a program is possible without requiring the halting of the system that is being operated.

A device driver that performs physical writing to the flash ROM in this embodiment is stored together with the added program in an external recording medium, and is loaded into the main memory and executed at the time the additional program is written.

<Program Loader>

Before explaining the operation of a program loader, the storage form for an executable program file will be described.

<General Form>

The general form of an executable program file format in this embodiment is shown in FIG. 10.

A file consists of a plurality of records. A record consists of a size field, a type field and a body field.

The size of a record is defined by the size field. The nature of a record is defined by a 1-byte module type. Actual data are stored in the body field. There is no limitation on the number of records that can exist in a file. The program loader reads information necessary for execution from the records in the file and executes it. The records that are not required for execution of the program are skipped without being recognized. The record types are shown in FIG. 11. An explanation will now be given for individual record types.

TYPE_OBJECT_INFO (omission inhibited)

This record uses text to define the nature of all the records up to the next "TYPE_OBJECT_INFO."

The record is described as having the form name=content with return, as is shown in FIG. 13.

TYPE_PROGRAM

This is a binary program.

TYPE_RELOCATE_TABLE

This is a table of addresses for a program by which absolute addressing is performed.

Figure 9:
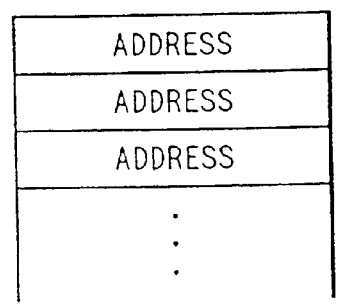
FIG. 9 is a diagram for explaining an address table.

This is a record that exists only when relative addressing is not supported as a command for the CPU. This record is a table in which is stored an address field for absolute addressing, as is shown in FIG. 9. It is assumed that the address width when the CPU performs absolute addressing is 32 bits. The values stored in the table are relative addresses with the first address in the program being the origin. The loader program rewrites the value for an address that corresponds to the binary program. The rewriting rule is as follows:

newly stored value=mapping destination address+value stored at that address <Compatibility with Multi-platform>

The sequential blocks in this embodiment can cope with a plurality of platforms. When data for a plurality of platforms are stored in one file, as is shown in FIG. 13, an execution file can be changed so that it is compatible with multiple platforms. The system can search a file for a module that can be executed by the system, and can execute the module. When an executable program file is employed on the assumption of a specific CPU, the type of CPU can not be changed. When an executable program file for which the CPU type is described is employed, the CPU can be changed as necessary to reduce manufacturing costs.

Figure 12:
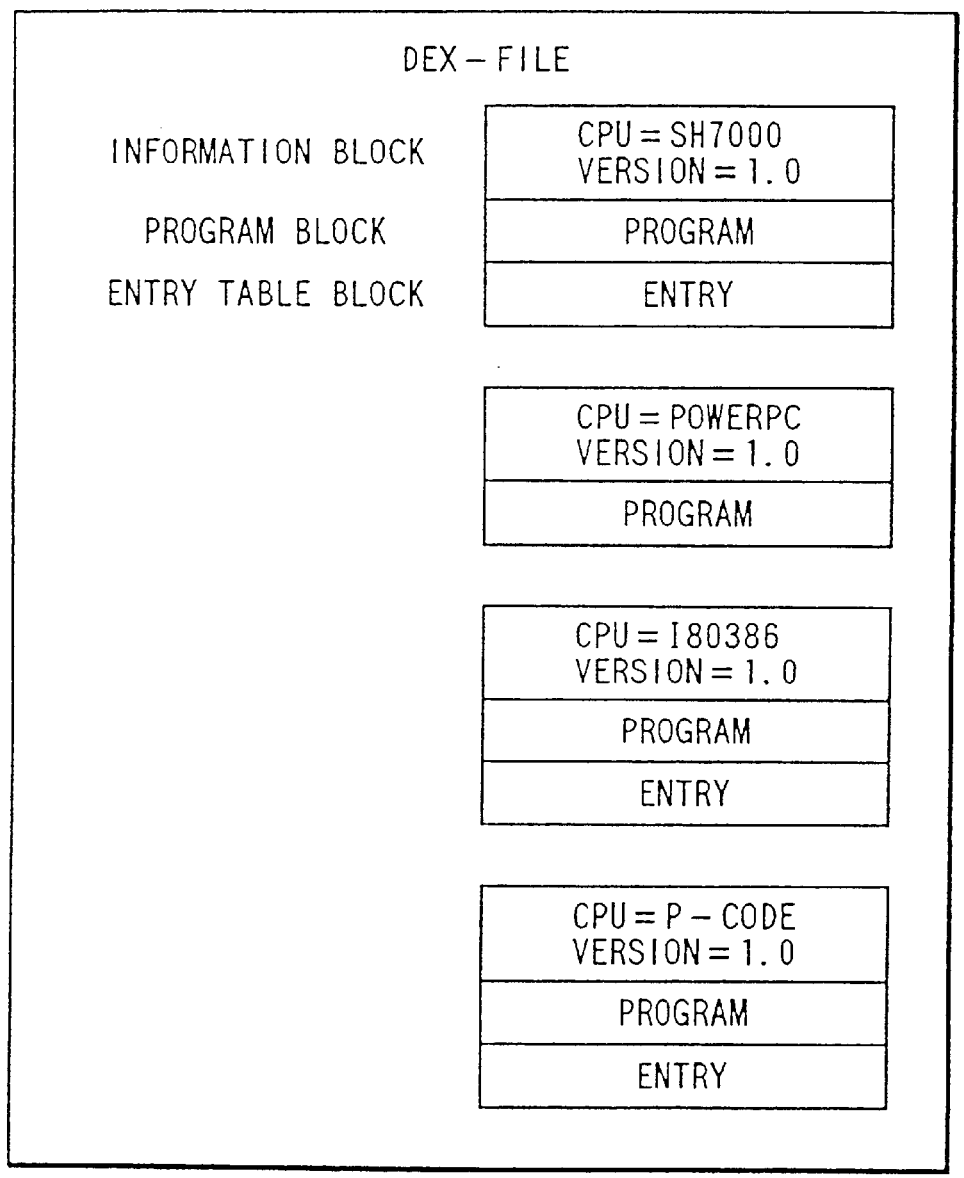
FIG. 12 is a diagram for explaining a program file.

In FIG. 12 is shown the state of a file in which a plurality of types of CPU programs are stored.

As was previously described, a system wherein the program is divided into modules and the addresses of the modules are changed requires means for detecting an address at which another module function exists The technique whereby the address of a sub-routine is determined at the time of execution is called late binding or dynamic linking. The employment of this technique can flexibly design the interface between modules. Dynamic linking for personal computers has as its main purpose the common use of a target library (sub-routine group). If the target library exists in the main memory, the linking is immediately completed. If the target library does not exist in the main memory, it is loaded into the main memory from a storage medium and linking is performed.

Figure 14:
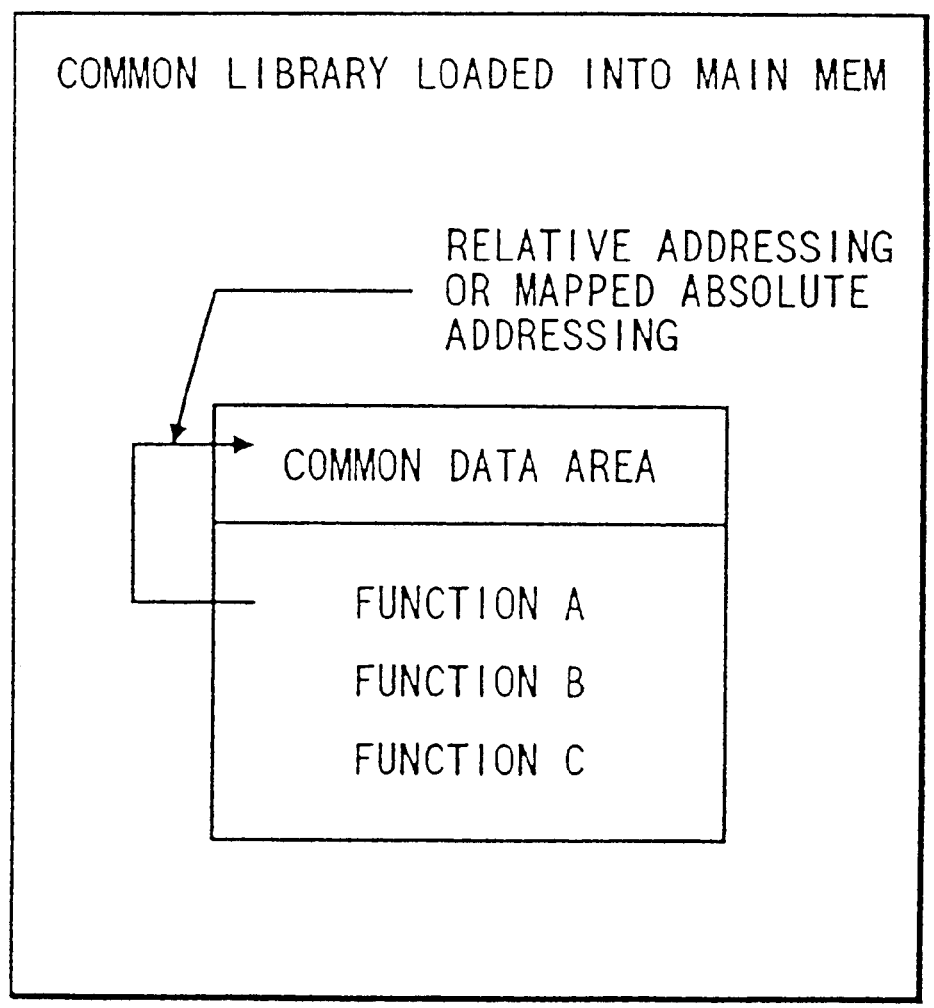
FIG. 14 is an explanatory diagram for a common library stored in a main memory.
Figure 15:
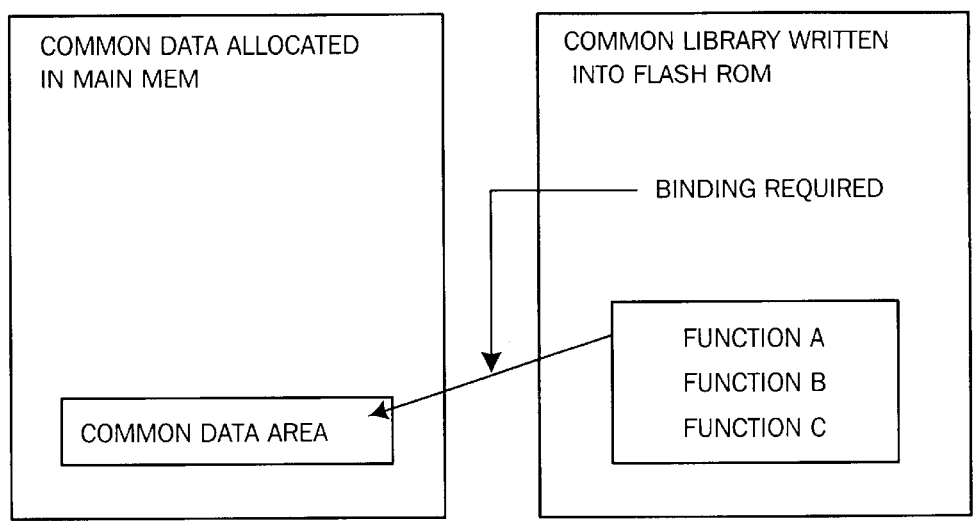
FIG. 15 is an explanatory diagram for a main memory and a common library that is stored in flash ROM.
Figure 16:
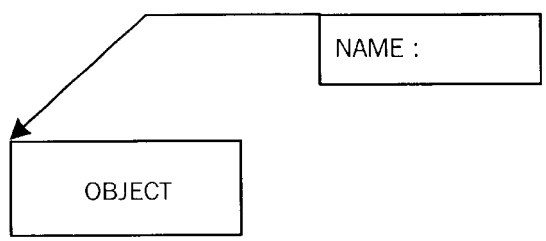
FIG. 16 is a diagram for explaining symbol management.

Since the software of a digital camera of the present invention is stored in the ROM, and common data are prepared by dynamic allocation, the common data must be dynamically bound. In FIG. 14 is shown the state of a common library that is loaded into the main memory. Function A accesses the common data. When function A is called, every task can access the common data. When the common data and the library are present in the main memory, the target data can be accessed, depending on whether relative addressing or mapped absolute addressing is used for the common data and function A. In FIG. 15 are shown a common library that is written into the flash ROM and common data that are allocated in the main memory. In this case, since the program for the flash ROM has been mapped, even though an address is determined when the common data is prepared, the program can not handle the address.

To bind common data between the processes, the timing between a task for preparing data and opening it in public (registering) and a task for searching for common data that is published (registered) is important. For dynamic linking with a personal computer, if a common library is not present in the main memory, it need only be loaded from the recording medium to the main memory. If there is no common data, however, this process can not be performed. When a system is so built that a search is instituted after a CPU has been engaged in another task for a specific period of time, it can be predicted that an enormous amount of CPU operating time will be spent for a wasteful search. To resolve this binding problem, according to the present invention, when as the result of a search, the target common data are not present, that task becomes dormant and the targeted common data are published (registered) by another task, so that the search task is again returned to the executable condition. With the above structure, the timing when a specific task initializes common data can be obtained. When a task for initializing common data is unspecified, exclusive control relative to the initialization of common data is required. More specifically, assume that task A has called an API for a process that includes initialization of common data. The API called by task A makes an examination to determine whether or not initialized common data exist. When common data do not exist, common data are prepared and initialized, and published (registered). Immediately before publication (registration), a task switch is turned on to change the task A to task B. Task B thereafter calls the same API as was called by task A. Since the common data have not yet been published (registered), task B also prepares and initializes common data, and publishes (registers) them. The API is then permitted to employ the common data and begins to perform its service. If the task switch is turned on again, task A will also publish (register) common data and the common data prepared by task B will be lost. To avoid such a complication, the system is so designed that an operation that continues from the time the search for common data is initiated until registration is accomplished is performed as an indivisible operation.

The APIs for accomplishing dynamic binding provide the following symbol management services.

(1) AddSymbol Registration of symbol
(2) FindSymbol Searching for symbol
(3) LockAndFindSymbol Locking and searching for symbol system
(4) UnlockAndAddSymbol Unlocking and registration of symbol system
(5) UnlockSymbol Unlocking of symbol system This system is so simple that a unique name for it is defined in common data, and an address is registered and searched for by using its name.

Figure 17:
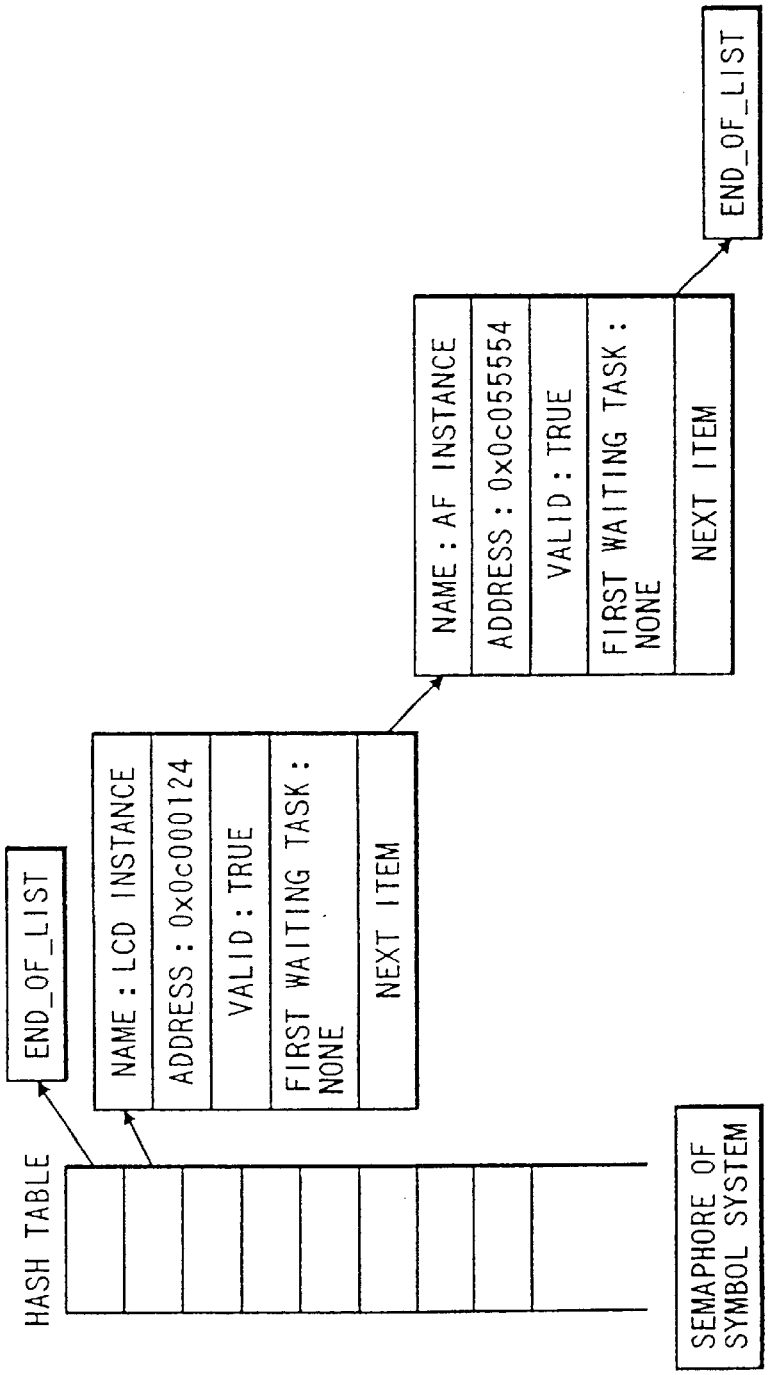
FIG. 17 is a diagram for explaining the internal structure of a symbol management system.
Figure 18:
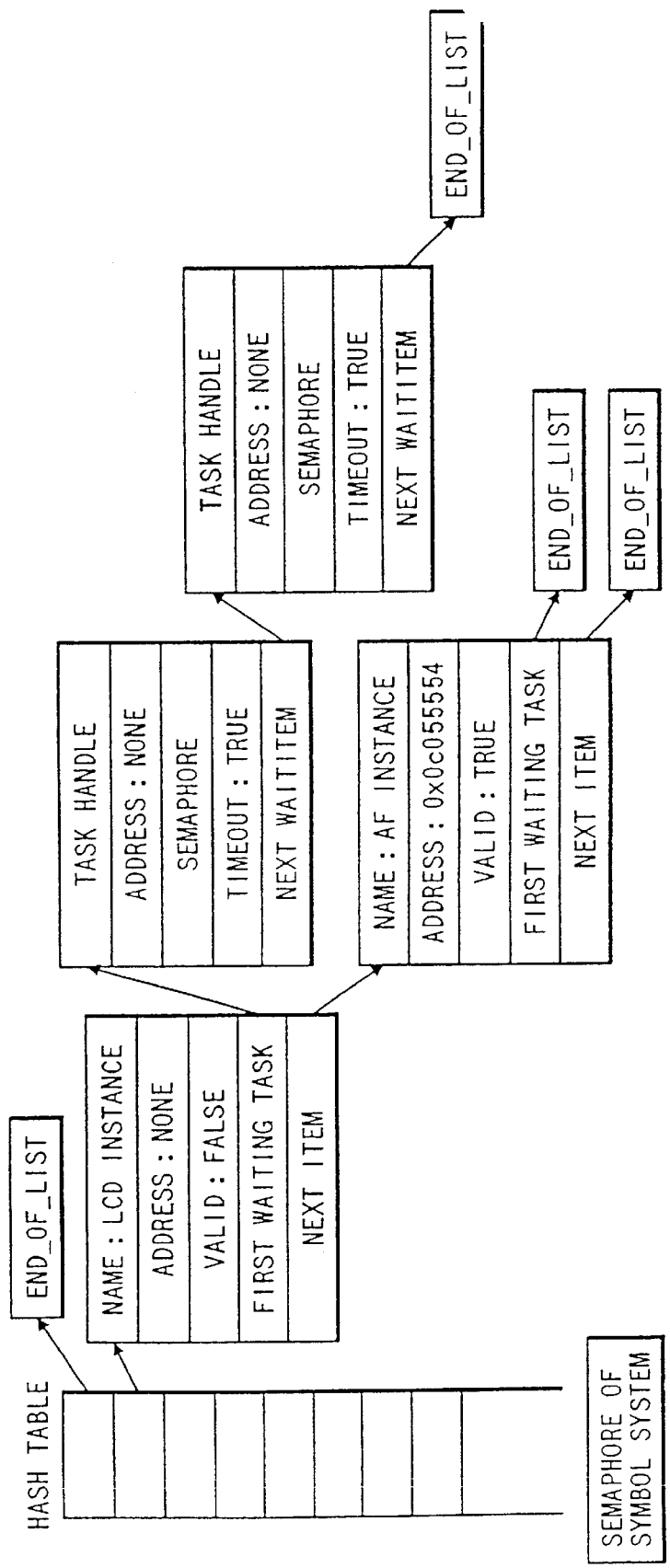
FIG. 18 is a diagram for explaining the internal structure of a symbol management system.

In FIG. 17 is shown the internal data structure of the symbol management system. When a symbol is specified and AddSymbol or FindSymbol is executed, first, the symbol management system obtains the semaphore for the symbol and performs a hash function on the designated symbol to acquire a hash value. The hash value may, for example, be the total for the character codes in a character train. The acquired hash value is employed as an index for examining a table. A pointer for first data is stored in the table. When END_OF_LIST is stored, it is assumed that a symbol having the acquired hash value has not yet been registered. Symbol data is registered as a linked list with its pointer as the head. Each ITEM on the list is compared with the designated symbol. In FIG. 17, symbols LCD_INSTANCE and AF_INSTANCE are registered. When a symbol is already present as the result of AddSymbol, an address field is rewritten. If no symbol exists, a new ITEM is prepared and added to the linked list. When a symbol is already present as the result of FindSymbol, the semaphore for the symbol is released and an address is returned to the application to immediately recover the task. If, as the result of FindSymbol, a symbol does not exist, an ITEM, for which a flag is set that indicates valid data has not yet been stored, and a WAITITEM, in which waiting task information is stored, are prepared and registered in the ITEM. The semaphore for the WAITITEM is set to 0 and a time out flag is initialized to TRUE in advance. This condition is shown in FIG. 18. In FIG. 18, two tasks are waiting for the registration of LCD_INSTANCE. The semaphore for the symbol is released, the timeout time designated by a parameter of FindSymbol is set, and an attempt is made to obtain the semaphore for the WAITITEM. Since the semaphore for WAITITEM is initialized to 0 in advance, acquisition of the semaphore fails and the task enters the sleeping state. To recover the task to the executable state, a timeout occurs or a signal is transmitted to the semaphore. If another task performs AddSymbol for a symbol while the task that is waiting for the symbol is sleeping, a value is substituted into the address for WAITITEM, a timeout flag is set to FALSE, and a signal is transmitted to the semaphore. The timeout for a return value for a function that is waiting for a semaphore is not employed because the timeout would occur at the same time as the transmission of a signal. That WAITITEM is omitted from the WAITITEM list. AddSymbol is repeated until the WAITITEM is removed. Since the FindSymbol task that is in the executable state first obtains the semaphore for a symbol, it will enter the sleeping state until the AddSymbol releases the semaphore. FindSymbol confirms the timeout flag after obtaining the semaphore. When it is not yet time for a timeout, the semaphore is released, the address field of the WAITITEM is returned, and the application is recovered. If it is time for a timeout, the semaphore is released, error code is returned and the application is recovered.

<Exclusive Control For Initialization of Common Date>

LockAndFindSymbol and UnlockAndAddSymbol or UnlockSymbol are functions for implementing exclusive control during a period between a search and registration.

Figure 19:
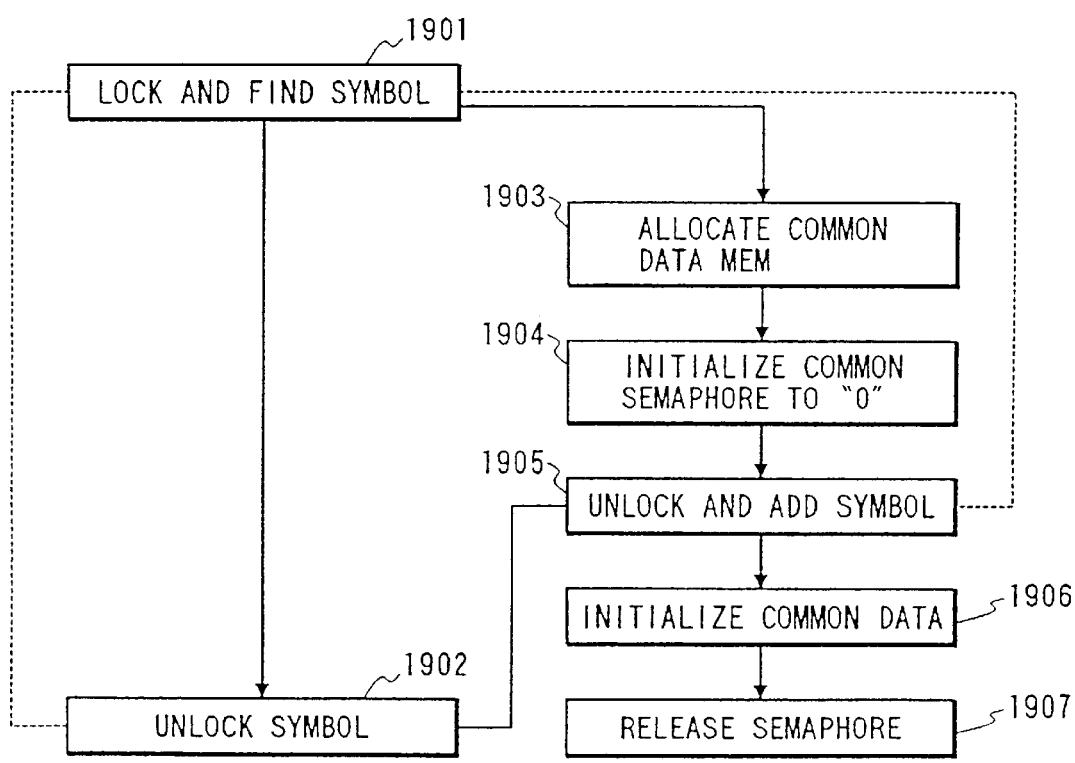
FIG. 19 is a flowchart for explaining the processing for initializing common data.

These functions ensure that the symbol management system is occupied during a period continuing from the time LockAndFindSymbol is executed until UnlockAndAddSymbol or Unlocksymbol is executed, and while a symbol operation (search or registration) by another task is inhibited. FIG. 19 is a flowchart showing the operation of a program for initializing common data using these functions. At step 1901, LockAndFindSymbol is executed to lock and search for a symbol. When as the result of the search a symbol is found, program control branches to step 1902. When no symbol is found, program control branches to step 1903. LockAndFindSymbol confirms the existence of a symbol at the current time, and immediately recovers when a symbol is not registered. Since the task does not enter the waiting state, there is no parameter for designating a timeout period. If, as the result of the execution of LockAndFindsymbol and the search at step 1901, no symbol is found, at step 1903, common data memory is allocated. At step 1904, the semaphore is initialized to 0. At step 1905, the UnlockAndAddSymbol function is employed to unlock the symbol and to publish the common data. Since the semaphore is initialized to 0, although the initialization of common data is incomplete the operational state will not be changed to a waiting state even when another task attempts to obtain the semaphore. If the symbol system is locked until the initialization of common data is completed, it delays the binding of another task that has a higher priority than its task. Therefore, it is better when the symbol system is locked for a sorter period. A block enclosed by dotted line in FIG. 19 indicates a period during which the symbol system is occupied. At step 1906, common data is initialized, and at step 1907, the semaphore for the common data is released. At this time, common data can also be used by another task. The operation for LockAndFindSymbol is very similar to the operation for FindSymbol, except that LockAndFindSymbol recovers immediately when no symbol exists without returning the semaphore for a symbol. UnlockSymbol is a function only for the return of the semaphore for the symbol. UnlockAndAddSymbol is also similar to AddSymbol, except in that the semaphore is not obtained since it is assumed that the semaphore for the symbol has been obtained.

The startup method for this camera will now be explained.

<Startup for Kernel>

When the CPU 5 in FIG. 1 is activated and the reset is released, the CPU 5 begins execution at a program entry point once the ROM 13 in FIG. 1 is reset. The basic functions, such as a real time operating system, are stored in the ROM 13. In order to upgrade the version of the operating system, a program in the ROM 13 jumps to the flash ROM 15 in FIG. 1 before the operating system is started. Since the program may run uncontrolled when the contents of flash ROM 15 are rewritten by error or by accident, a keyword is stored at a specific address in the flash ROM 15, so that only when the keyword is matched, the program jumps to the flash ROM 15. When there is a bug in a program in the flash ROM 15, or when there is a partial accidental writing failure, the program may also run uncontrolled. The writing failure can be avoided by writing a keyword after the writing of a program and its verification is completed. The uncontrolled running of the system due to a program bug can not be prevented, since such a problem occurs mainly at the development stage. It is easier for mounting and for debugging to employ special hardware that can prevent the above problem. The special hardware need only pull a specific bit at an IO port up to a power source, or pull it down to ground. In this embodiment, the bit at the port of the PC interface 19 that is pulled up in FIG. 1 is short-circuited to ground to notify the camera of the existence of a maintenance mode. If the maintenance mode is detected at startup, the program in the flash ROM 15 is not executed, even when the keyword is matched, and the system, operated only by a program in the ROM 13 in FIG. 13, sets a mode for performing the operation of the flash ROM 15. Since special hardware is required, this function will not cause any marketing problems.

Figure 20:
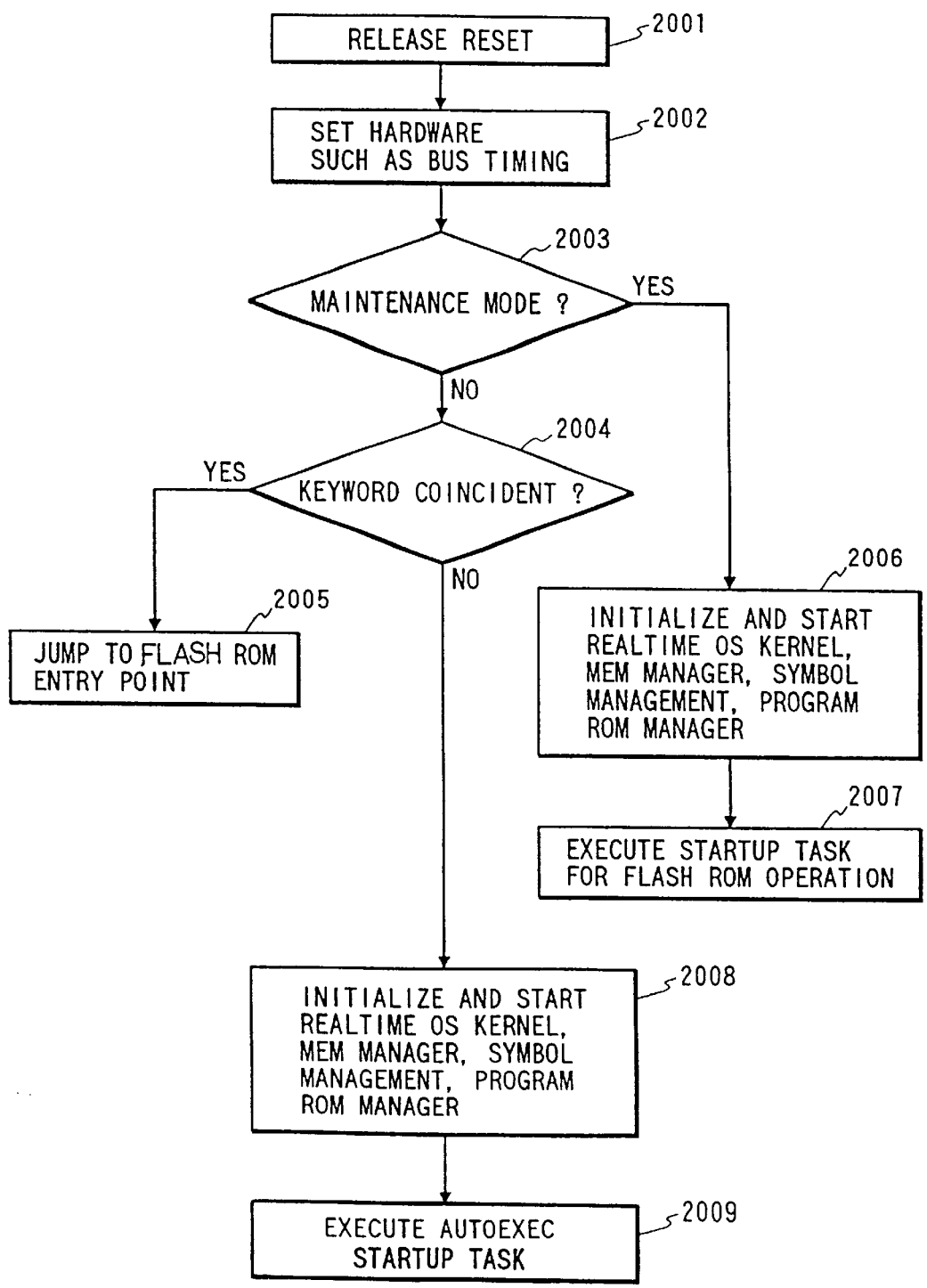
FIG. 20 is a flowchart for explaining the processing for a startup sequence.

FIG. 20 is a flowchart for a startup sequence in this embodiment. When the reset is released at step 2001, the CPU 5 reads a specific address in the ROM 15 and begins its operation at this address. At step 2002, minimum required hardware setups, such as the timing for a BUS, are completed. At step 2003, a check is performed to determine whether or not the mode is a maintenance mode. In this embodiment, a check is performed to determine whether or not the port for the interface 19 that is pulled up is short-circuited to ground. When the mode is a maintenance mode, program control branches to step 2006. At step 2006, the real time OS kernel, the memory manager, the symbol management system and the program ROM manager are initialized and started, and at step 2007, a startup task for a flash ROM operation program is executed. The startup task has necessary task tables, and sequentially prepares tasks for execution.

If, at step 2003, the mode is not a maintenance mode, program control branches to step 2004. At step 2004, a keyword at a specific address in the flash ROM 15 is examined. While a method for reserving a keyword in an area that the program ROM manager does not manage can be employed, if a keyword is set at the last address in the flash ROM and the maintenance mode is not employed, a general program can also be stored. When it is determined, at step 2004, that the keywords match, program control branches to step 2005. At step 2005, since the program jumps to the flash ROM 15, a program for replacing an operating system or a program for an additional hardware setup can be prepared. When at step 2004 the keywords do not match, program control branches to step 2008. The process at step 2008 is the same as that at step 2006. At step 2009, the program ROM manager is employed to search for the autoexec startup task for the digital camera and execute it.

<Startup of Digital Camera>

Figure 21:
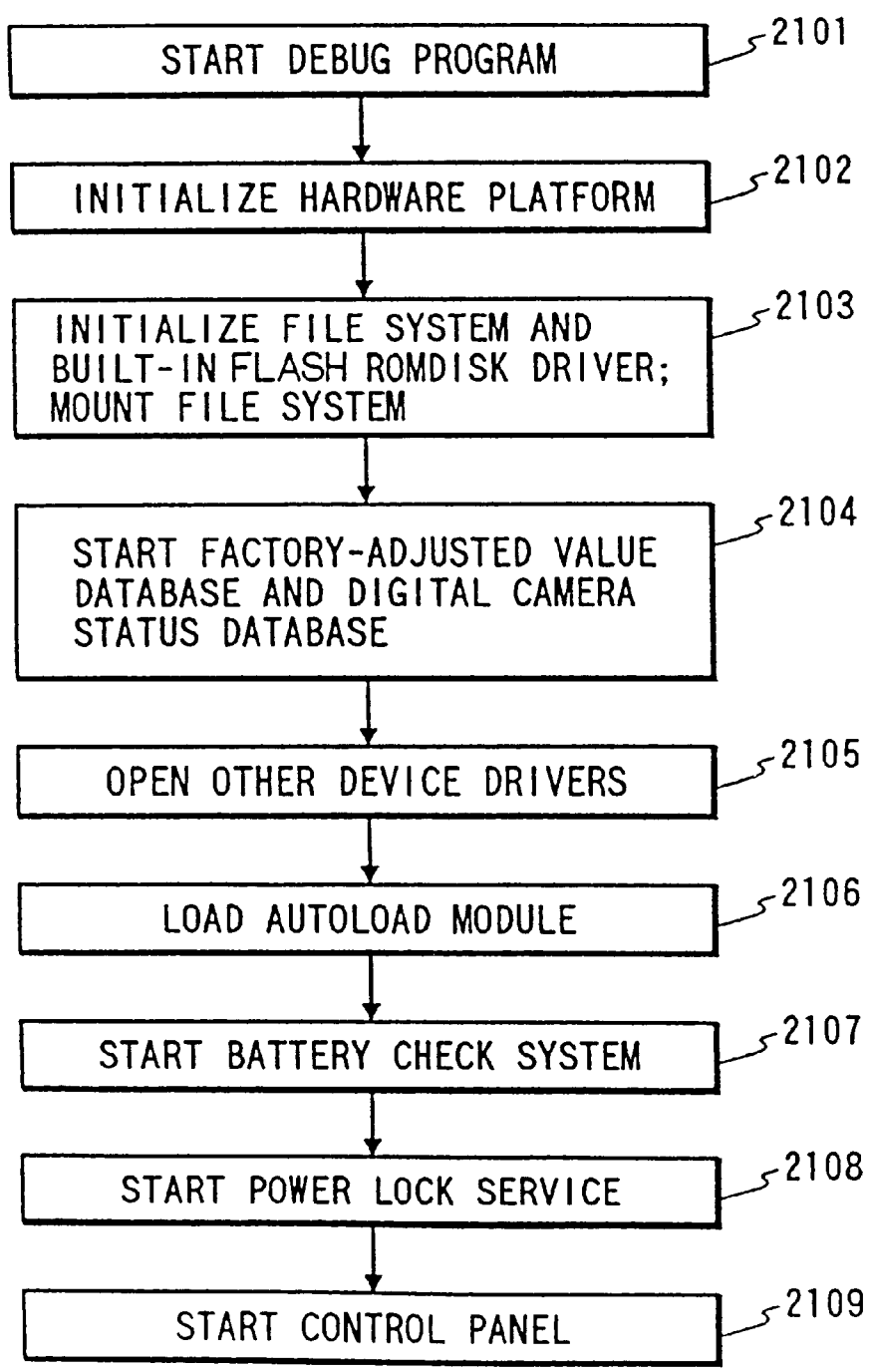
FIG. 21 is a flowchart for explaining the processing for a startup task.

The important function of the digital camera is begun at step 2009. The autoexec startup task operation at step 2009 in FIG. 20 is shown in the flowchart in FIG. 21. The autoexec startup task, which has module name tables, performs searches for modules via the program ROM manager according to the table, and sequentially prepares tasks. In FIG. 21 the order for the tables is roughly grouped and represented.

At step 2101, a debugging program is started. This program includes a Watchdog and Illegal operation code trap for detecting an abnormality, and a program that is used only for the development of a historical log service. At step 2102, the hardware is initialized. A driver for virtual hardware is also prepared. Also at step 2102, a low battery process hook and a shutdown hook are initialized and published.

At step 2103, a file system and an incorporated flash ROM Disk driver are initialized and the file system is mounted.

At step 2104, database service for factory adjustment value data is begun, and a camera status database is started. At this time, the file system initialized at step 2103 is employed to open a file for the incorporated flash ROM Disk factory adjustment value data, and data for the factory adjustment value are read. A data file for a camera status is also opened and read. The camera status data include a current compression rate, the ON/OFF state of a strobe, and the remaining free ROM Disk capacity.

At step 2105, a task only for the opening (registering) of other device drivers is activated. The device drivers of the digital camera consist not only of well known personal computer device drivers, but also the multiple device drivers that control the features that depend on the hardware of a digital camera; and a CCD device, a JPEG device, a signal processing accelerator device, a photometry device, a colorimetry device and a focus control device. At this time, an entry point for the device driver is only published as a symbol. At step 2106, if an executable field that has a specific file name exists in the incorporated flash ROM Disk, the file is loaded into the main memory and executed. Since a program in the incorporated flash ROM Disk is ready for execution, the function of the camera can be expanded without writing to the flash ROM 15 that is managed by the program ROM manager. When the program of the incorporated flash ROM Disk provides a driver that has the same name as that of the device driver at step 2105, complete replacement of the function is possible. At step 2107, a battery checking system is started, and at step 2108, a power lock service is started. At step 2109 a control panel is started. At this time, information designated by depressing a button is transmitted via the control panel, and the photographic function is begun. The device driver is bound after the process at step 2109 is performed. Replacement of a module by the rewriting of a symbol must be performed before the process at step 2109.

<Execution File>

When there is no unused area in the incorporated flash ROM 15 for the addition of a program, all of the programs must be erased. The writing of an additional program to an external storage medium is required to cope with more applications.

If at startup the digital camera reads the additional program from the external storage medium, the startup period for the digital camera will be greatly affected by the startup period for the external storage medium. Startup for the digital camera begins when a user depresses a key on an operation console. During an approximately 200 millisecond period following the touching of the key by a user, a time lag occurs during which the control panel ignores noise. If the startup is not completed during this period, a response to the manipulation by the user is slow, and usability is deteriorated. To start up the hard disk a period of seven to less than twenty seconds is required. Therefore, it is impossible to load an additional program directly from the external storage medium. According to this invention, if an automatic execution file exists in the external storage medium at the time the external storage medium is inserted into the digital camera, the file is copied into the incorporated flash ROM Disk, and is then erased from the flash ROM Disk at the time the external storage medium is removed from the digital camera. With this arrangement, the automatic execution file in the external storage medium can be quickly loaded at startup, and can be executed. The timing where the automatic execution file is loaded at the startup was explained at step 2106 in FIG. 21.

<Virtual IO Port>

A custom device is used for the BUS for the digital camera. If the custom device can be produced at a lower cost, accordingly, a digital camera can be manufactured at a lower cost. It is required that a circuit that has as few gates as possible and as many functions as possible be mounted in order to reduce the manufacturing costs of a peripheral custom device. Although the number of gates for a peripheral custom device can be considerably reduced by employing one address decoder to control several functions and by providing only a writing function for a control register (the CPU can not read the contents), the design of control software is difficult. In this embodiment, a virtual IO port having a read and write buffer is used in common by software modules, so that a software arrangement can be provided that is the equivalent of a structure having a read out function for a control port of a peripheral custom IC.

Figure 22:
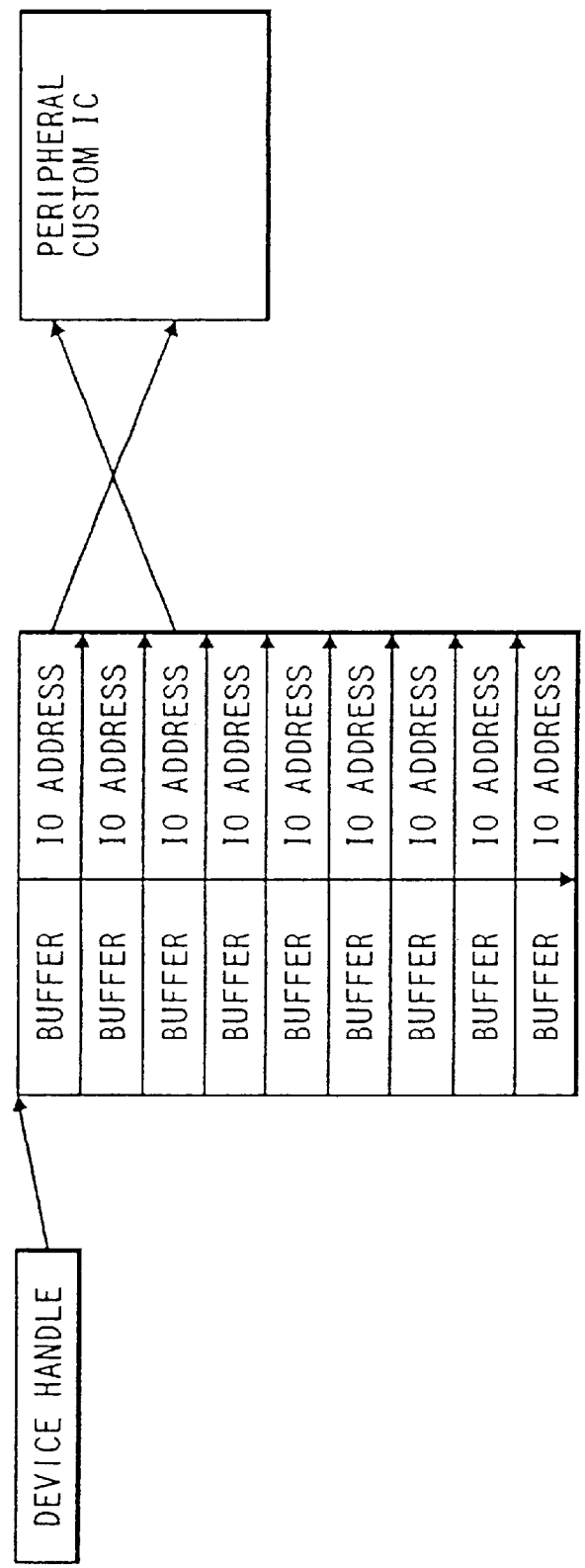
FIG. 22 is a diagram for explaining the data structure of a virtual IO port.

In FIG. 22 is shown the data structure of the virtual IO port. An application performs control by using a device handle and a register ID number. The API performs a read/modify/write operation for the buffer arrangement designated by the device handle, and writes the contents to a peripheral device by using IO address information, which together with the buffer is stored as a pair. The device handle is initialized at step 2102 in FIG. 21, and its symbol is registered.

Figure 23:
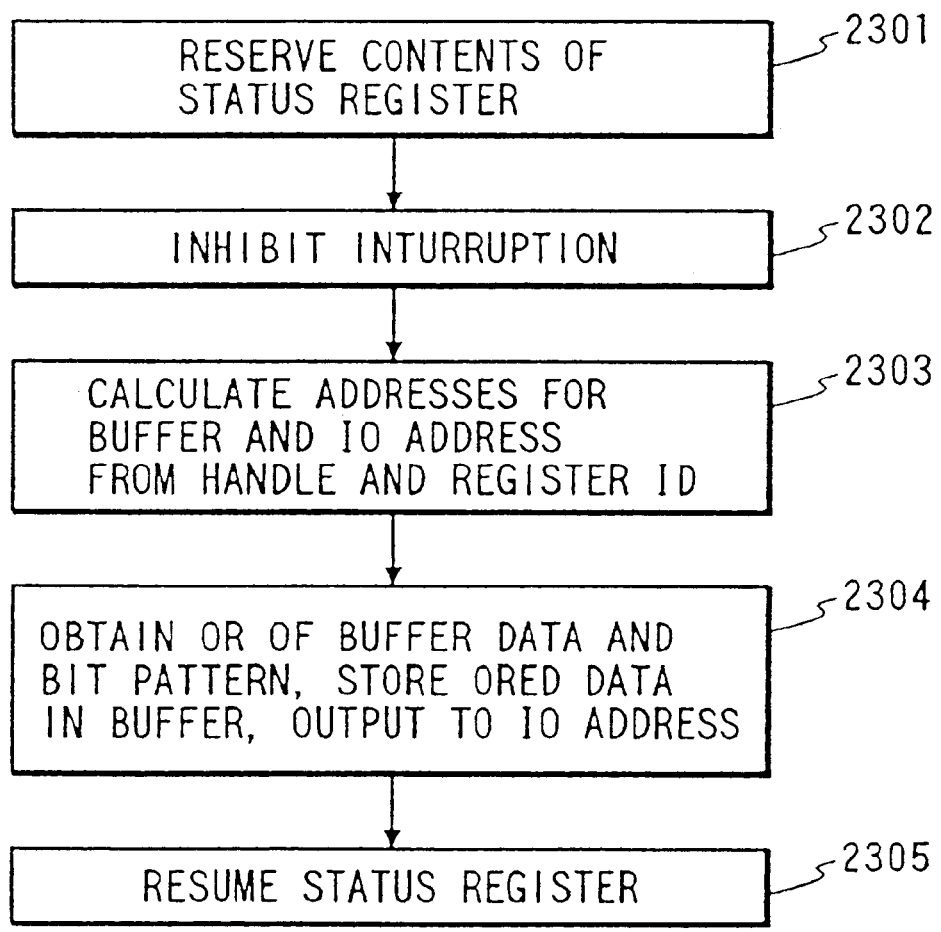
FIG. 23 is a flowchart for explaining the processing for a bit set function.

FIG. 23 is a flowchart for a bit set function using the virtual device. At step 2301 the contents of a status register are reserved. At step 2302 an interrupt is inhibited. At step 2303 the handle and the register ID are employed to calculate an address for a buffer and an IO address. An index value in the table in FIG. 22 is defined in advance as the register ID. At step 2304 the OR value of the buffer data and a bit pattern that is to be set is acquired, and is stored in the buffer and is also output (written) to the IO port. At step 2305 the status register is recovered. If the status register was in an interrupt enabled state before the process at step 2302 was begun, the status register returns to that state.

A control program can be prepared, as the API of the virtual device, by a writing and reading process that designates a bit clear and a bit width in addition to a bit set.

A merit of the utilization of the virtual device is that the virtual device can be used for debugging, such as by changing the API to acquire the IO history. In addition, when the address of a peripheral device is to be changed because of an alteration of the hardware design, only the values in a table need be changed, so that management and alteration is easy. In other words, the development period and the manufacturing costs can be reduced.

<Hook Management>

Figure 24:
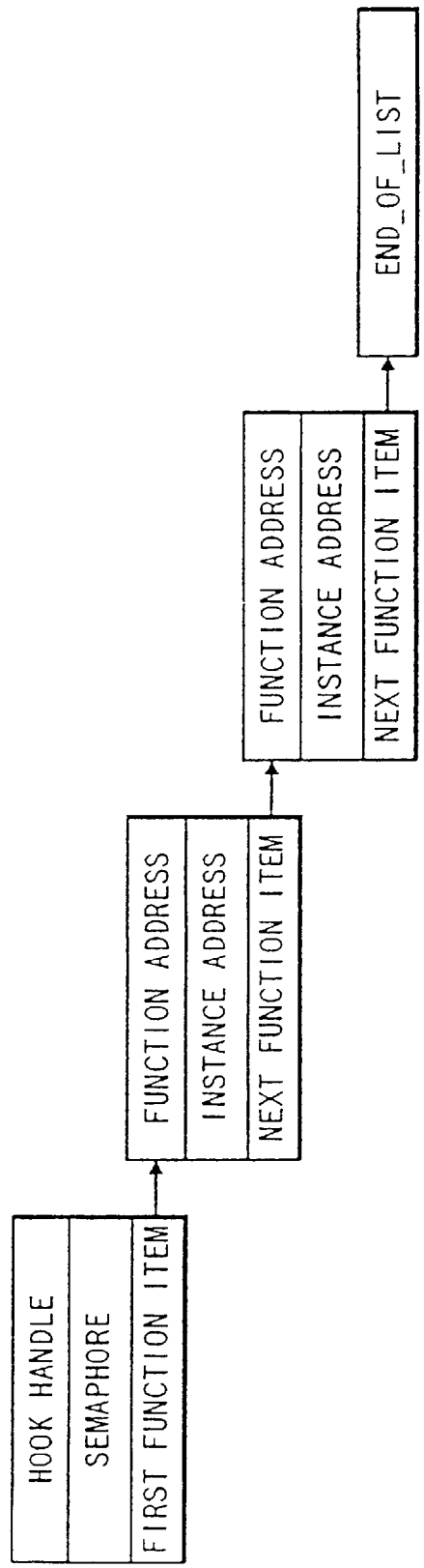
FIG. 24 is a diagram for explaining the data structure for hook management.

A call back process is sometimes required for the occurrence of an event. For an unspecified majority of clients who request a call back, it is convenient that an API for managing them be provided. A call back service used by an unspecified majority is required for a digital camera because an exception process is required in almost all control programs for an exception process for a low battery process and for a shutdown process. In this invention, an API for managing hooks is prepared as a service provided by an operating system. The hook APIs provide the following services:

(1) preparation of a hook handle
(2) withdrawal of a hook handle
(3) registration of a function and an instance
(4) release of the registration of a function (deletion from a list)
(5) execution of a hook For preparation of a hook handle, a hook management memory is allocated, the semaphore is initialized to 1, END_OF_LIST is substituted into the first function, and a pointer for the memory is transmitted to the application as a hook handle. For the registration of a function and an instance, a hook handle, a function address and an instance address are designated and called, a function and an instance are registered, and a handle for the function is returned. The function handle is used later to delete the function. In FIG. 24 is shown the data structure for hook management. Two functions are registered for a hook handle.

Figure 25:
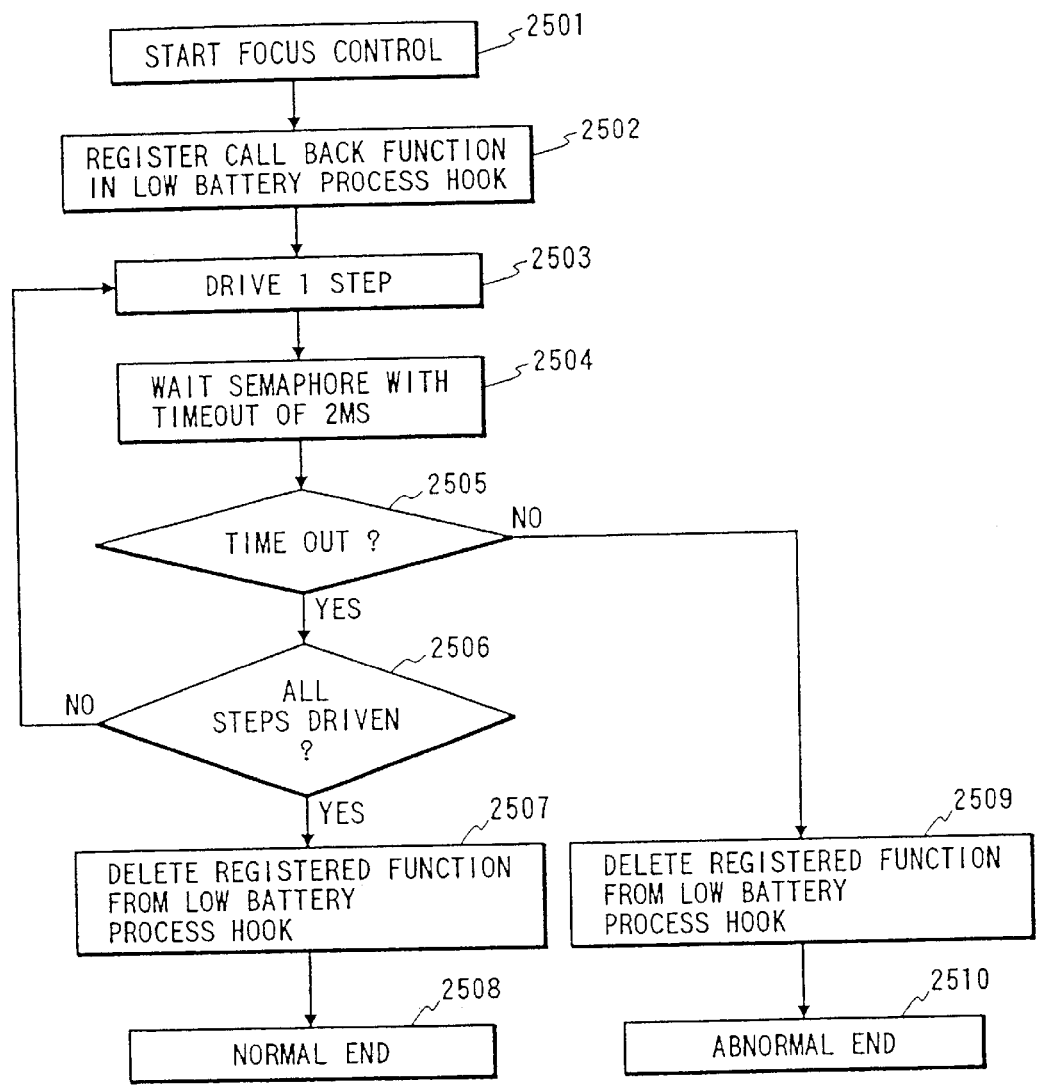
FIG. 25 is a flowchart for explaining focus control.

For the execution of the function, the semaphore is obtained and following the list the functions are sequentially executed. An example application using the hook will now be described while referring to the flowchart in FIG. 25. The example in FIG. 25 is a control program for a focus motor. At step 2501, focus control is begun. At step 2502 a call back function is registered in a low battery process hook. The function registered at this time is the function shown in the flowchart in FIG. 26. A semaphore for focus system control waiting is registered as an instance. This semaphore is used in the call back function. At step 2503 one step is driven. At step 2504, acquisition of the semaphore, which is designated as the instance for the call back function at step 2502, is attempted by designating the timeout. Since this semaphore is initialized to 0, normally, its acquisition fails and the timeout occurs. At step 2505 a check is performed to determine whether or not the timeout has occurred. If the timeout has occurred, program control branches to step 2506. If the timeout has not occurred, program control branches to step 2509. At step 2506, a check is performed to determine whether or not all of the steps that must be driven have been driven. If the driving of steps has not yet been completed, program control moves to step 2503. When the driving of steps is terminated, program control branches to step 2507. At step 2507, the function that is registered at step 2502 is deleted from the hook. At step 2508 processing is terminated normally. If, at step 2505, the timeout has not occurred, at step 2509 the function that is registered at step 2502 is deleted from the low battery process hook. At step 2510 an error code indicating an abnormal end is returned and program control returns to the calling source.

Figure 26:
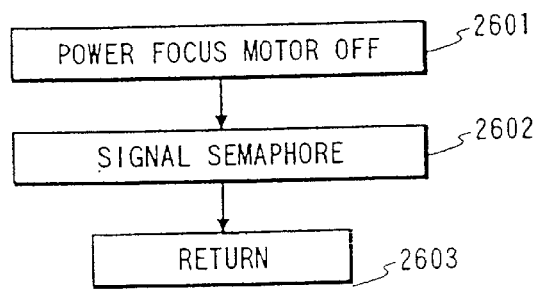
FIG. 26 is a flowchart for explaining focus control.

FIG. 26 is a flowchart of the call back function that is registered at step 2502. At step 2601 the focus motor is powered off, at step 2602 a signal is transmitted to the semaphore, and at step 2603 program control is returned. If, at step 2602, the call back function does not signal the semaphore, the timeout always occurs at step 2505 in FIG. 25. Since the exception process for the low battery is performed using this arrangement, the response between the detection and the processing is quick, and control that efficiently uses the CPU time can be performed.

<Event Procedure>

A program that is called after the startup is a process for an event designated via the control panel. An event that the control panel transmits to the main CPU is information concerning which key has been depressed or released. When manipulations, such as double button depressions or two-button depressions, are assigned to various functions, many functions can be provided by a small number of keys. An event for a depressed key is transmitted to a module that translates the key operation. After the meaning of the key operation is translated by the module, a corresponding function for the digital camera is activated. The function of the digital camera performs a single functional operation, such as EraseSingle or SetMacroMode. This function is managed as a table for a sub-routine that is called upon the occurrence of an event, and this table is called an event procedure. In this table, stored as pairs, are names and functions, and in a personal computer, such a table is mounted for a text editor, such as Emacs, for supporting a macro language. The digital camera of the present invention prepares an event procedure table at startup time. Therefore, since an automatic execution file replaces a specific event procedure, part of the functions of the digital camera can be changed.

<Main Power Manager>

When the system is activated, control is begun that corresponds to an event originating at the control panel. In a system wherein the power is always off when the photography and recording processes are terminated, processing for a time lag between the startup time and the shutdown time, and DISK cache flush processing must be performed each time, and a sequential operation response will be deteriorated. It is preferable that a DISK cache system and an EF charging system be designed separately from a recording application. However, the operational states of such subsystems must be controlled to power off the system. In addition, it should be taken into consideration that the function of the camera is expanded by using an automatic execution file and by recording and photographic processing that is performed by remote control exercised by a personal computer. It is very difficult for a program for powering off such a system to be designed as part of the main sequence.

In this invention, the above problem is resolved by preparing a system that turns off the main power of the digital camera.

APIs for a main power manager (1) Locking power
(2) Unlocking power
(3) Automatic shutdown time setting The uppermost program in each application locks the power relative to the main power manager. Since, for example, a DISK cache and an EF charge are designed as independent applications, they lock the main power. During a period wherein the main power is locked, the main power manager ensures the supply of the main power. The main power manager counts the number of locks, and calculates an auto shutdown time by using the timing when the number of locks is 0. When the period wherein the number of locks is 0 reaches N continuous milliseconds, the operation enters the shutdown sequence. And when a value held by a lock counter is other than 0 within N milliseconds of the time the number of locks was 0, the supply of the main power is again ensured. It should be noted that when a low battery is detected by a low battery detection system an exception occurs whereby supply of the main power is cut off.

Figure 27:
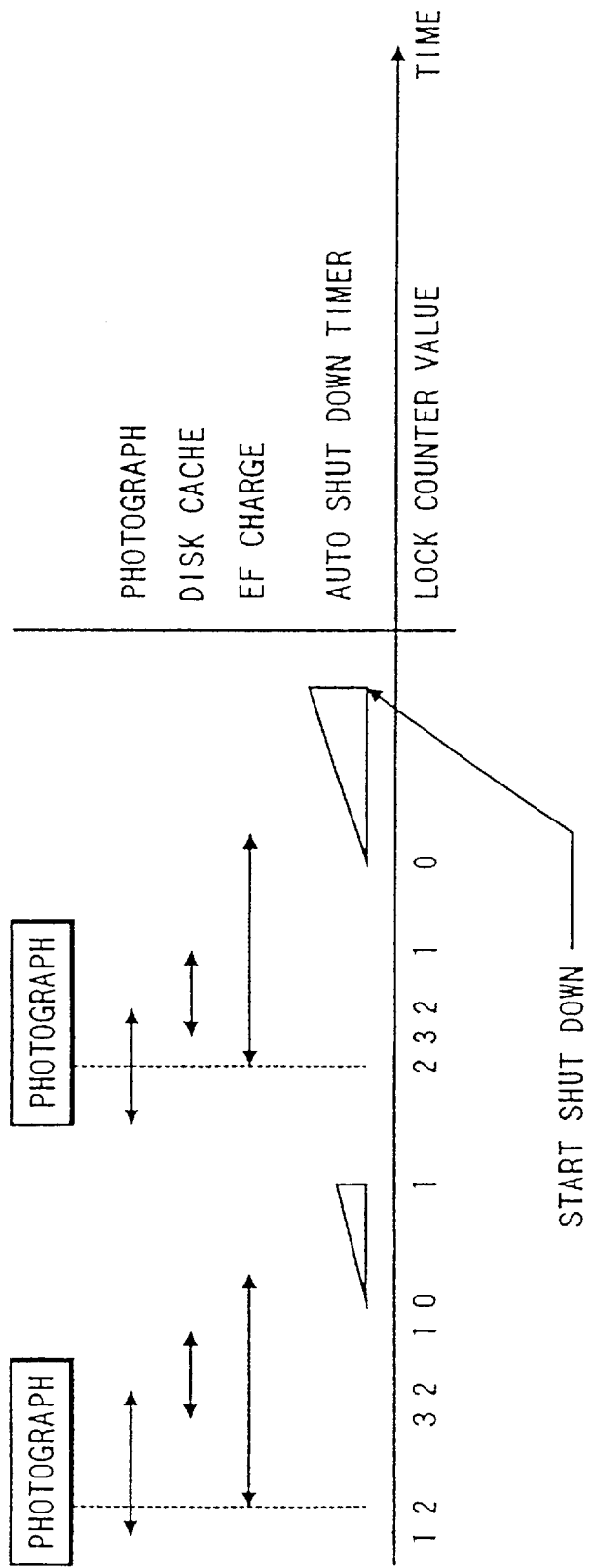
FIG. 27 is an explanatory diagram for a focusing operation.

FIG. 27 is a time chart showing a power lock counter and an auto shutdown timer. The top line represents a period wherein a photographic application locks power. A dotted line for photography indicates an exposure timing. The preceding period is a waiting period wherein AF or AE is being performed. Since a strobe is employed for the exposure, EF charging is begun and an EF charge program locks the main power. The value held by a lock counter is represented along the bottom line. At this time, since the photographic program and the EF charge program lock the main power, a 2 is held by the lock counter. Subsequently, an exposed image is processed and the resultant image is stored as an image file in a storage medium. Then, the DISK cache is activated to lock the main power. At this time, a 3 is held by the lock counter. Although the photographic program thereafter completes all the processing, the DISK cache and the EF charge are still operated, so that a 2 is held by the lock counter. When all of the data held in the DISK cache have been written to the DISK, and when, from the main power to the strobe, the EF charge has built up sufficient power for the next photograph, the value of the lock counter is 0, and the auto shutdown timer begins the measurement of time. As the photographic operation is ready again before a sufficient period of time has elapsed, a shutdown does not occur and the value held by the lock counter is changed to 1. The value held by the lock counter is changed later from 1 to 2, 3, 2, 1 and to 0. The auto shutdown timer is activated and a shutdown is begun after N milliseconds have elapsed.

<Shutdown Process>

The shutdown process differs from an application that is currently being performed. The shutdown processing also differs for a case where there is an additional program. Therefore, it is better to perform the process by executing the hook. Sometimes, however, the order relative to another shutdown process is important. The database shutdown process is performed to close a file, but when a file system has been shutdown, even the closing of a file can not be performed. To resolve this problem, according to the digital camera of the present invention, therefore, a shutdown is performed by executing the hook, and the shutdown process is divided into three layers, which are performed in order.

Shutdown layers (1) Application layer
(2) System layer
(3) Device layer

At the startup, a hook handle is prepared and is published for each layer. In the application layer (1), a database or a communication remote control program performs a shutdown. In other words, data are written to a file, or an end message is transmitted to a personal computer. In the system layer (2), a shutdown process is performed for a file system and a communication data link layer. In the device layer (3), the supply of power to a PCMCIA card is cut off, or communication with a control panel is shut down. After all of the hooks are executed in the above described order, the main power is turned off. Since the file system is included in the shutdown process, several tens to several hundreds of milliseconds are required, even though this may vary, depending on the size of the DISK cache. When a low battery condition occurs, the system is shut down quickly. If, because of a drastic voltage drop, the system operation is ensured only for several milliseconds, only the process in device layer (3) is performed. There are several ranks for low battery detection by the camera. Only when a battery has such a poor quality that the normal voltage for the inhibition of the operation can not be detected, the shutdown process for only device layer (3) is performed. In this case, a file system may be damaged, but an error that is more fatal, such as a current leakage, can be avoided.

<Processing for FATAL ERROR>

When a fault, such as the malfunction of hardware, is detected, the digital camera must display an error and halt the system. Since the system is separately designed for each module, it is difficult at the design stage to define the processing that is to be performed after the detection of a fault. In addition, even if the processing after the detection of a fault is defined, a problem may be caused when a program, such as an automatic execution file, is added. For the resolution of this problem, according to the present invention, a special module for handling an error process is defined to form an abstract processing contents. Recovery methods for the occurrences of error are roughly sorted, and an error type is transmitted using an error code. Although four giga types of errors can be handled if a double word is defined as error code, so many error types may not be required. Therefore, 512 codes for specifying an error type are sufficient. In this embodiment, an upper word of error code is regarded as an error type and a lower word is used as a display. In FIG. 28 is shown a table for FATAL ERROR types.

A FATAL ERROR is defined as an internal event equivalent to key input in the event procedure. An ABORT error is used mainly when there is a fault in a mechanical part, such as a shutter or a focus motor. Since the system can be continuously and safely operated when there is a fault in the shutter or the focus motor, the system displays an error and returns to a mode for receiving the next operation. For example, since photographing in the daytime is possible even though a strobe malfinctions, a user can select whether he or she should have the camera repaired or continue photographing without using the strobe. In other words, the user can photograph with the camera as much as possible. INIT DB is employed for a case where a fault is detected at a timing when an error may occur in a free capacity of a storage medium or in directory information, such as a case where a fault occurs while a photographic image is written to a disk, and for a case where an error is detected in the free capacity for a storage medium or directory information. When the FATAL ERROR module receives this type of error code, the free capacity of the storage medium and the directory information are obtained again. An INIT_SYS error code is used when a fault occurs that may damage the logic structure of the incorporated DISK, or when damage to the logic structure of the incorporated DISK is detected. Important information, such as status information for the digital camera, is stored in the incorporated DISK, and if the information is incorrect, the digital camera can not be operated safely. In addition, when writing to the incorporated DISK is continued, progressive damage to the logic structure of the DISK may occur, and a photographed image file could also be lost. The digital camera is set to a mode that enables only the reading of image and voice data from the incorporated DISK and DISK formatting, and complete initialization must be performed manually by a user. ASSERT is used mainly when an error occurs internally and uncontrolled running is detected during development. When the FATAL ERROR module receives this code, a debug information log is ejected and the mode enters an analysis mode. Since a plurality of modules cooperatively operate, when one module detects an error, this induces another error. However, in many cases the original error is first reported. The FATAL ERROR module always displays only the error that was first reported. On the other hand, the recovery means recovers the most fatal error first. The error codes in FIG. 28 are described in order beginning with the least fatal error.

Figure 29:
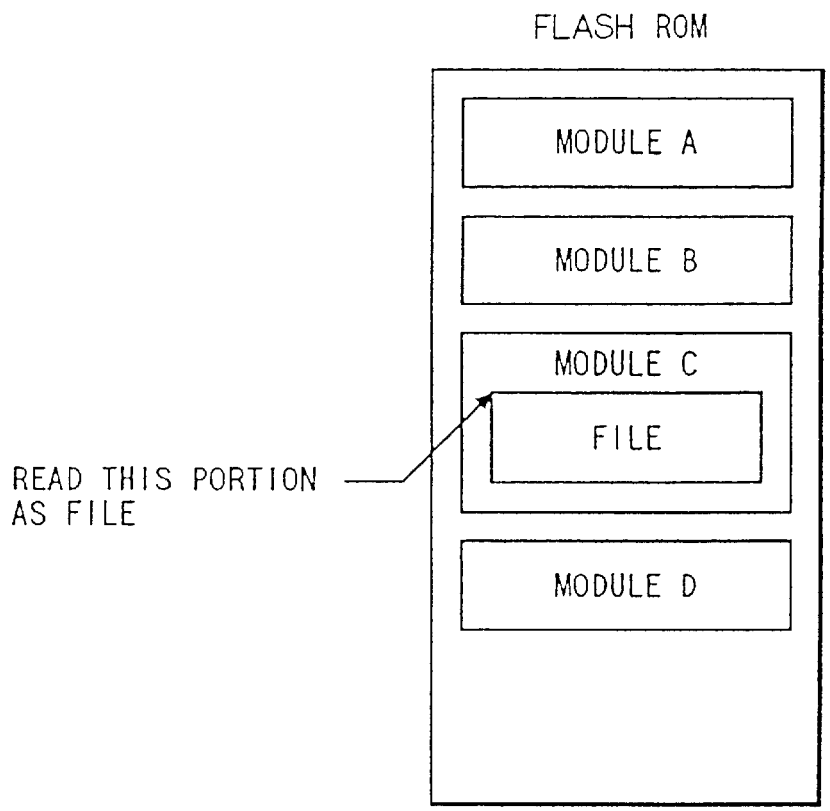
FIG. 29 is a diagram showing one part of a program ROM serving as a file.

As was previously explained, an important file that is necessary for the operation of a system is stored in the incorporated flash ROM Disk. The operation of the digital camera is determined by that file. This, however, does not apply when there is a fault in the incorporated flash ROM Disk. A double basic design must be provided as a design especially for a process performed when a fault occurs in the incorporated flash ROM Disk. In this invention, when a fault exists in the incorporated flash ROM Disk, one part of a program ROM is employed as a read only file to determine an operation to be performed when the incorporated flash ROM Disk has a fault. Further, immediately after the incorporated flash ROM Disk is formatted, that file is copied from the program ROM to enable continuous operation. In FIG. 29 is shown one part of a program ROM that is employed as a substitute for a file. The read function is used to read a file in C language, while the memcpy is used for reading from the flash ROM.

<Operation for Symbol Management>

1. AddSymbol—UnlockAndAddSymbol <registration of symbol>

Figure 30:
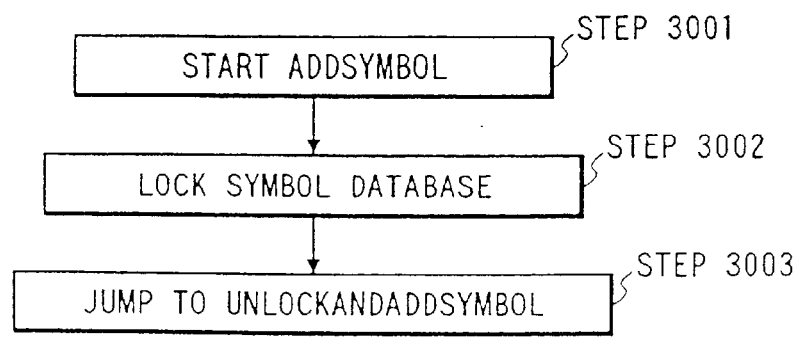
FIG. 30 is a flowchart showing the processing for AddSymbol.
Figure 31:
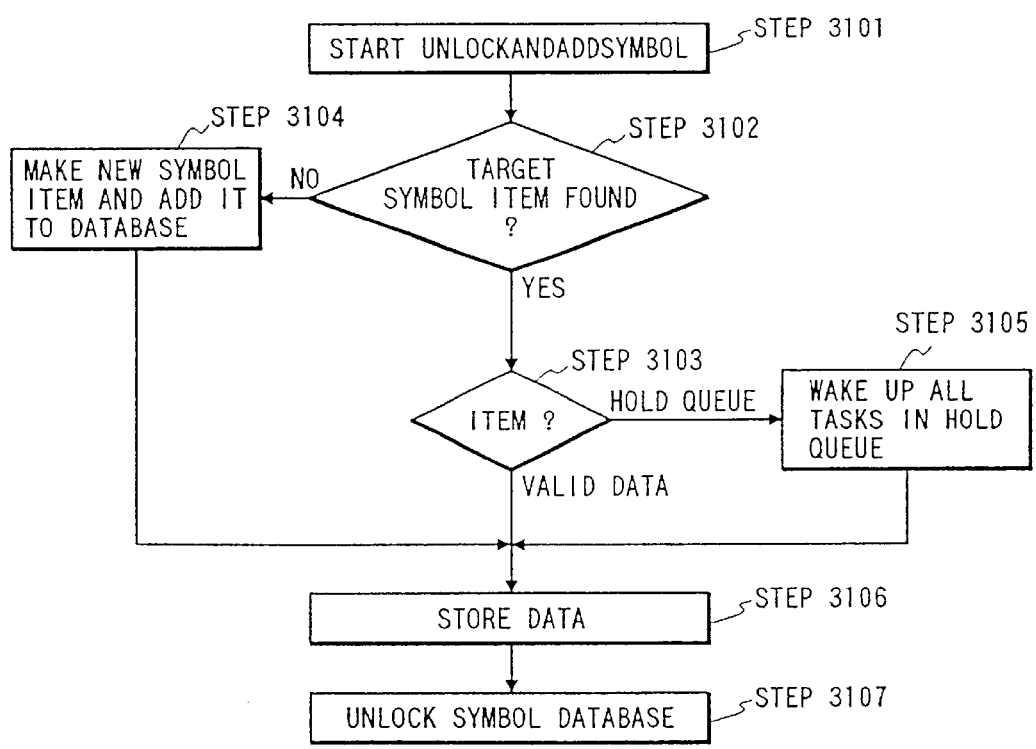
FIG. 31 is a flowchart showing the processing for UnlockAndAddSymbol.

The AddSymbol function and the UnlockAndAddSymbol function will now be described. UnlockAndAddSymbol is an OS call that is specified at step 1905 in FIG. 19, and the definition of its existence was previously explained. UnlockAndAddSymbol is mounted as one part of the AddSymbol function. Therefore, it is efficient to explain both the AddSymbol and UnlockAndAddSymbol functions at the same time. FIG. 30 is a flowchart for AddSymbol. At step 3001 AddSymbol is started. At step 3002 a binary semaphore is employed to perform exclusive lock for a symbol database. At step 3003 the function jumps to UnlockAndAddSymbol. AddSymbol is the same as UnlockAndAddSymbol, except for the locking of the symbol database. FIG. 31 is a flowchart for UnlockAndAddSymbol. At step 3101 UnlockAndAddSymbol is started, and at step 3102 a pertinent symbol is searched for. If a pertinent symbol item is not found, at step 3104 a new symbol item is prepared and is added to the database. When, at step 3104, a pertinent symbol is found, program control branches to step 3103. At step 3103, a check is performed to determine whether that item has valid data or a handle for a target task. If the item has a task in a queue, at step 3105 all the tasks in the queue are awakened. Following steps 3104, 3103 and 3105, at step 3106 data are stored in the new item, and at step 3107 a symbol table database is unlocked (the semaphore is released).

2. FindSymbol <search for symbol>

Figure 32:
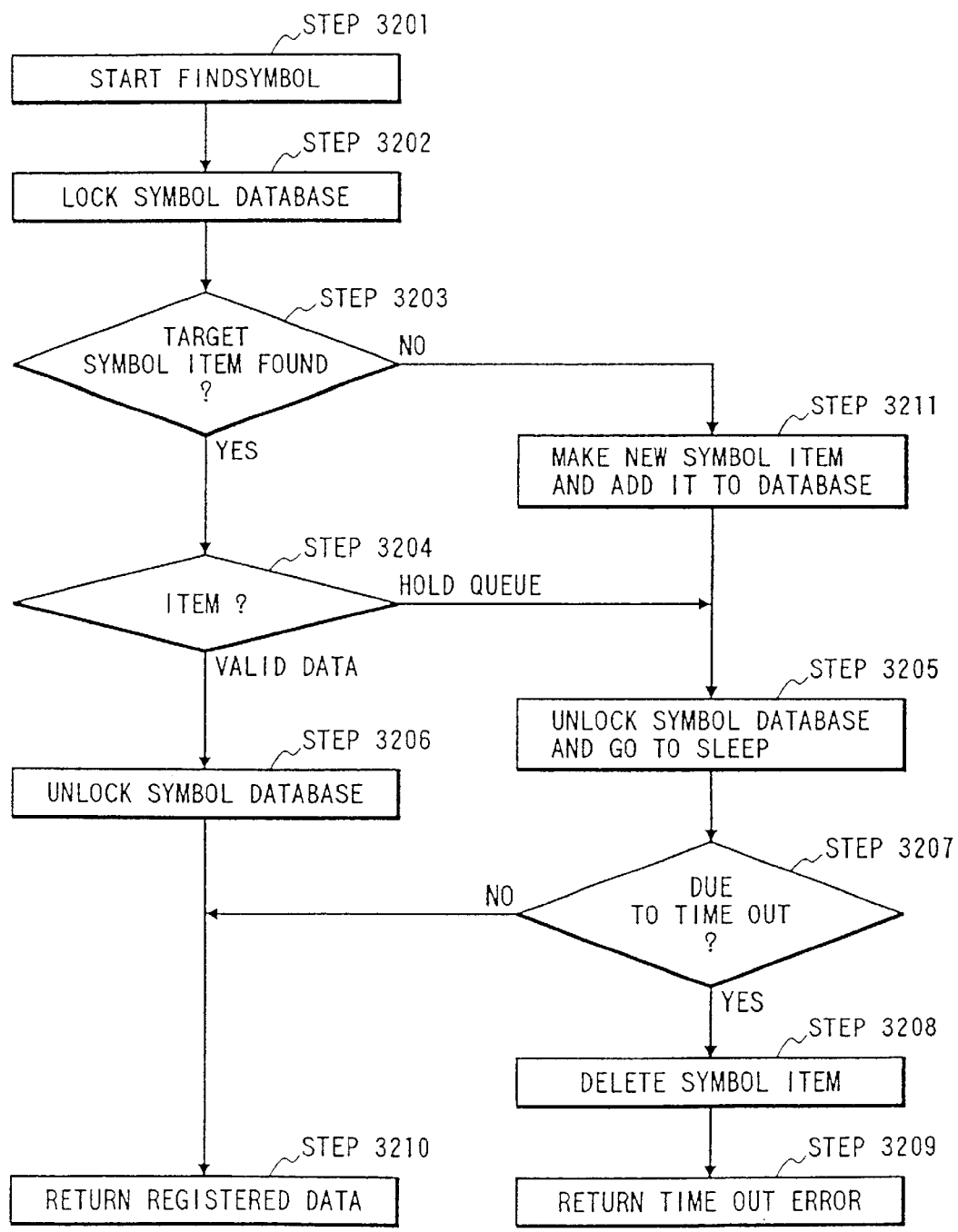
FIG. 32 is a flowchart showing the processing for a symbol search function.

FIG. 32 is a flowchart for a symbol search function for FindSymbol. At step 3201 FindSymbol is started. At step 3202 a semaphore method is employed to lock a symbol database. At step 3203 a pertinent symbol item is searched for. When, as the result of the search, it is found that a symbol does not exist, at step 3211 a new symbol is prepared and is added to the database. If, at step 3203, a pertinent symbol item is found, program control branches to step 3204. At step 3204, a check is performed to determine whether valid data or a handle for a queuing task is included in the item. If the handle for the queuing task is included, program control branches to step 3205. Also, after the process at step 3211, program control moves to step 3205. At step 3205 the symbol database is unlocked and the system goes to sleep. The system remains in the sleeping state until the timeout period expires or until the system is awakened by AddSymbol/UnlockAndAddSymbol. When, at step 3204, valid data is included in the item, at step 3206 the symbol database is unlocked, and at step 3210 registered data are returned. When the system is awakened at step 3205, program control moves to step 3207. At step 3207, a check is performed to determine whether or not the awakening is due to the occurrence of the timeout. If the awakening is due to the registration of data, program control branches to step 3210 whereat registered data are returned. If, at step 3207, the awakening is due to the occurrence of a timeout, at step 3208 the symbol item is deleted if there is no other queuing task, and at step 3209 a timeout error is returned.

Figure 33:
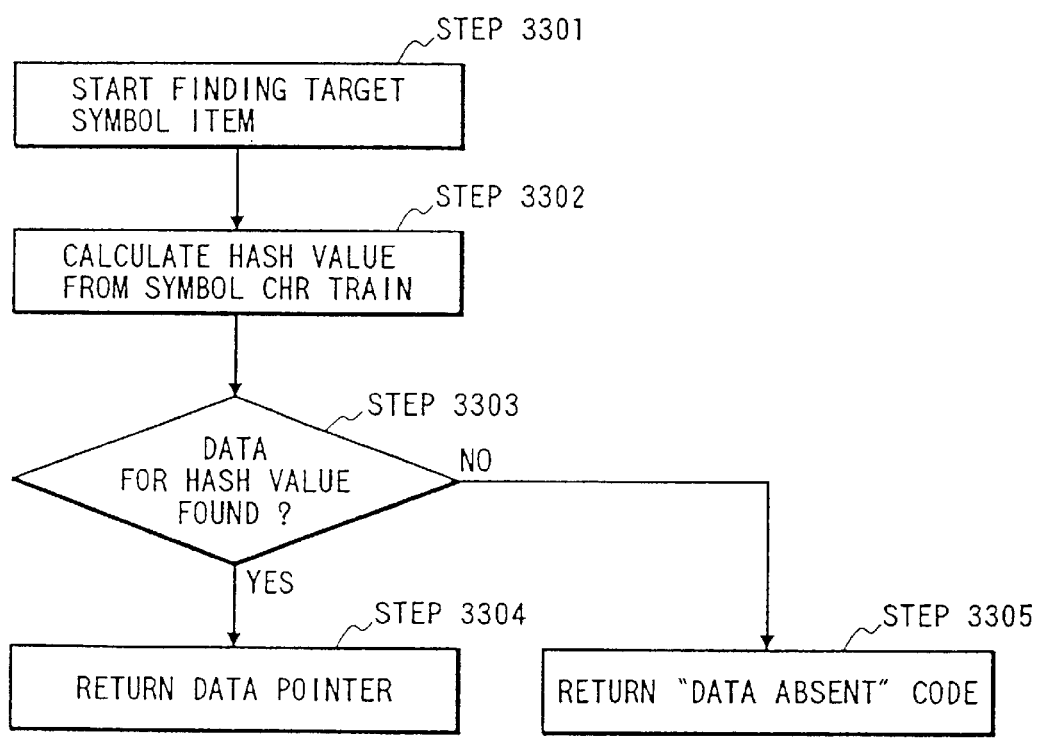
FIG. 33 is a flowchart showing the processing for a search for a symbol item.

FIG. 33 is a detailed flowchart of the search for a pertinent symbol item at step 3203 in FIG. 32, and at step 3102 in FIG. 31. At step 3301 the search for the pertinent symbol item is begun. At step 3302 a hash value is calculated using a symbol character train. At step 3303 a list of data corresponding to the hash value is searched for. If a pertinent item is not found, program control branches to step 3305, whereat data absence code (NULL) is returned. If, at step 3303, a pertinent item is found, program control branches to step 3304, whereat a pointer to that item is returned.

3. LockAndFindSymbol <lock and search for a symbol system>

Figure 34:
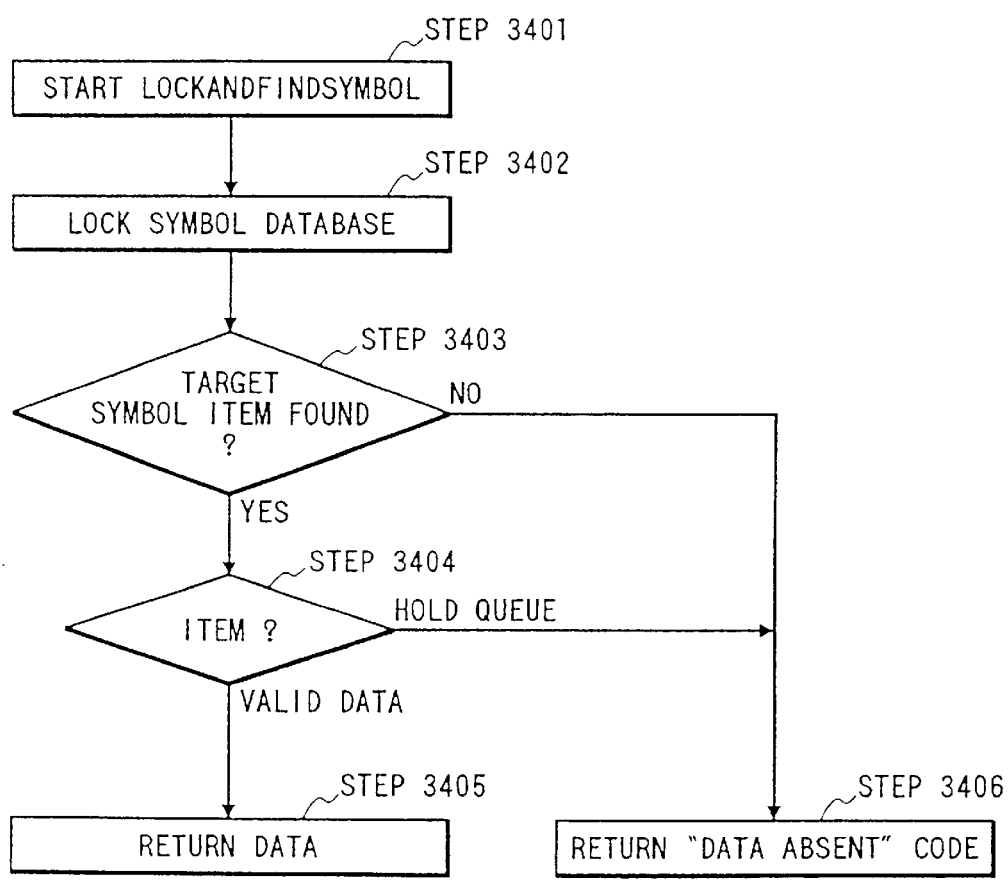
FIG. 34 is a flowchart showing the processing for LockAndFindSymbol.

FIG. 34 is a flowchart for the LockAndFindSymbol function. At step 3401, LockAndFindSymbol is started. At step 3402, an exclusive lock is performed for a symbol database. At step 3403 a pertinent symbol is searched for. This employs the function explained while referring to FIG. 33. If a pertinent item is not found, program control branches to step 3406, whereat error code indicating there is no data is returned. When, at step 3403, a pertinent symbol is found, at step 3404 a check is performed to determine whether valid data or a handle for a queuing task is stored. If, at step 3404, valid data is not stored, at step 3406 error code indicating there is no data is returned. When, at step 3404, valid data is stored, at step 3405 data is returned.

<API of Main Power Manager>

The operation of the main power manager shown in the time chart in FIG. 27 will now be explained while referring to flowcharts. An application calls the LockMainPower function immediately before acquisition of power is required, while it calls the UnlockMainPower function when power may be turned off.

1. LockMainPower (locking of power)

Figure 35:
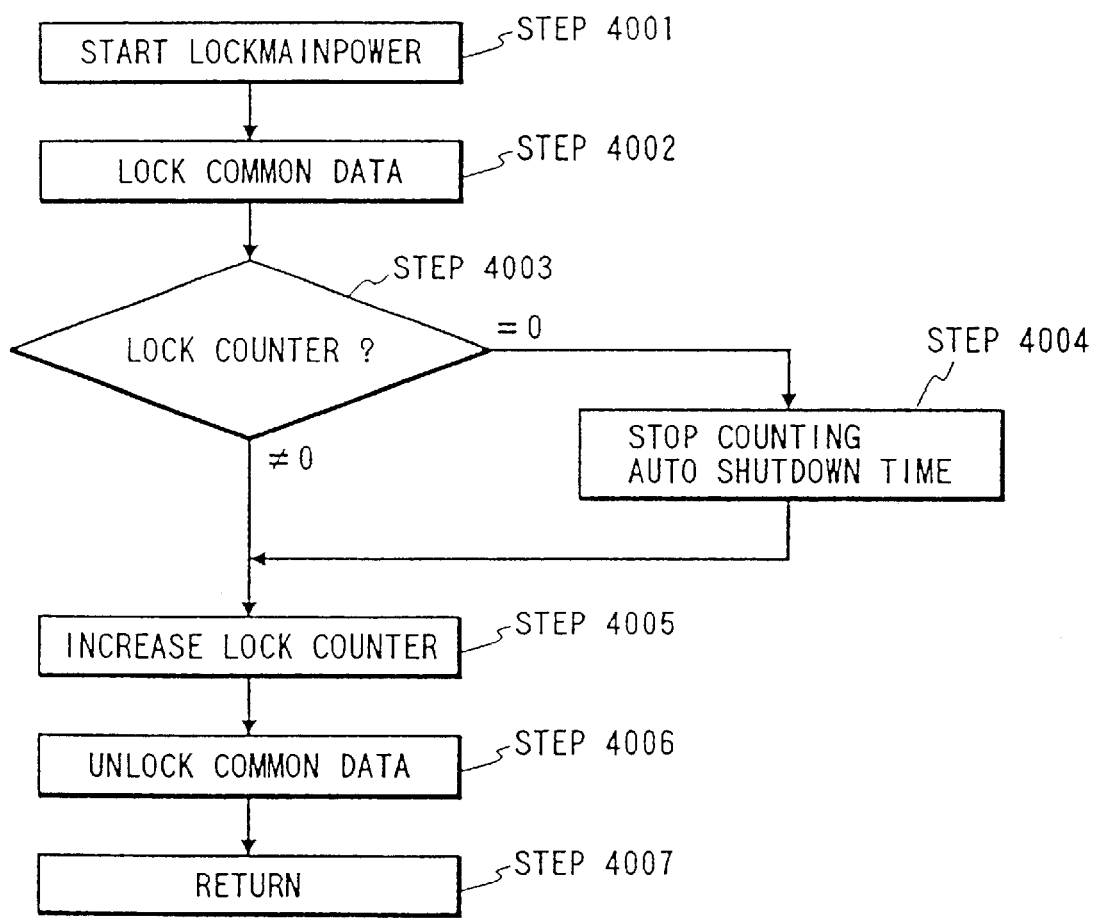
FIG. 35 is a flowchart showing the processing for LockMainPower.

FIG. 35 is a flowchart for LockMainPower. At step 4001 LockMainPower is started, and at step 4001 the semaphore is employed to provide exclusive control of common data. The common data here are data, such as those for a lock counter and a count stop flag, that are used internally by the main power manager. At step 4003 a check is performed to determine whether a value held by the lock counter is 0. If the count value is 0, at step 4004 the counting for the shutdown time is halted. More specifically, the count stop flag is set to TRUE. At step 4005 the value held by the lock counter is incremented. At step 4006 the common data are unlocked, and at step 4007 the system is recovered.

2. Unlocking of power

Figure 36:
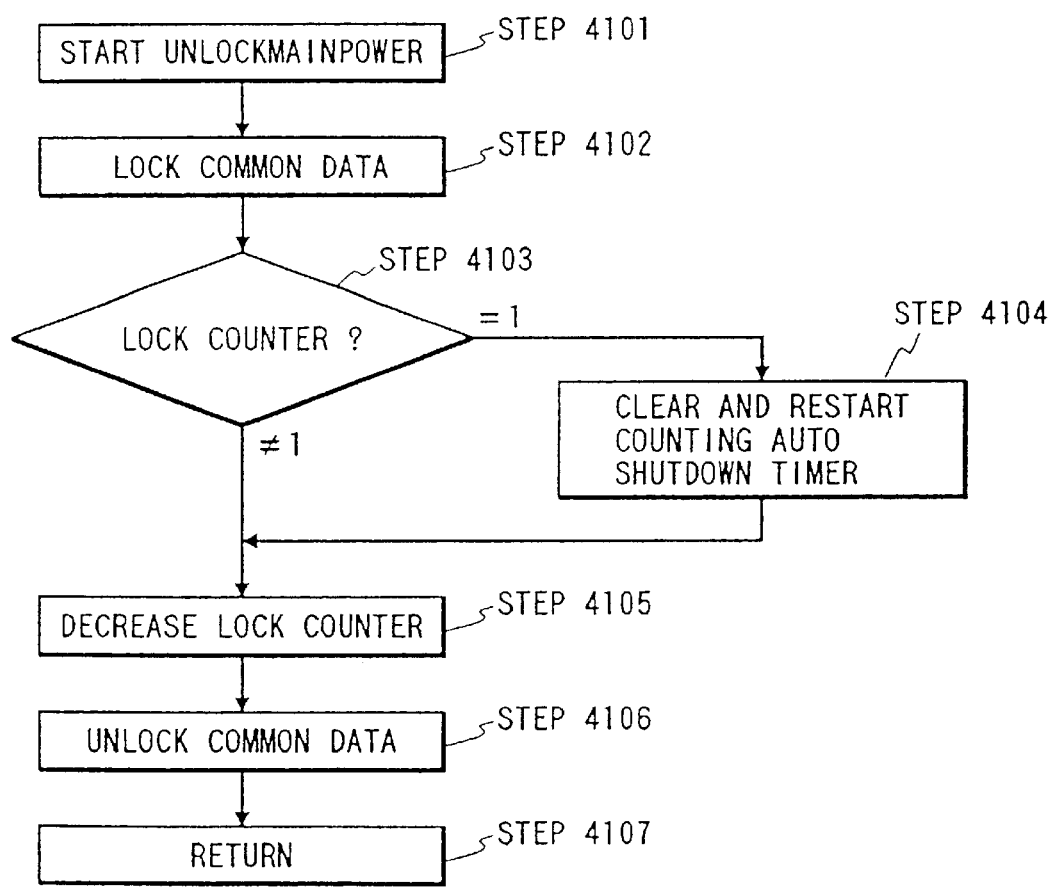
FIG. 36 is a flowchart showing the processing for UnlockMainPower.

FIG. 36 is a flowchart for UnlockMainPower. At step 4101 UnlockMainPower is started, and at step 4102 the semaphore is employed to provide exclusive control for common data. When at step 4103 the value held by the lock counter is 1, program control branches to step 4104. At step 4104 the count value for the auto shutdown time is cleared, and counting is restarted. More specifically, the count stop flag is set to FALSE. At step 4105 the value held by the lock counter is decremented, and at step 4106 the common data are unlocked. At step 4107 the system is recovered.

3. Counting Auto Shutdown Time

Figure 37:
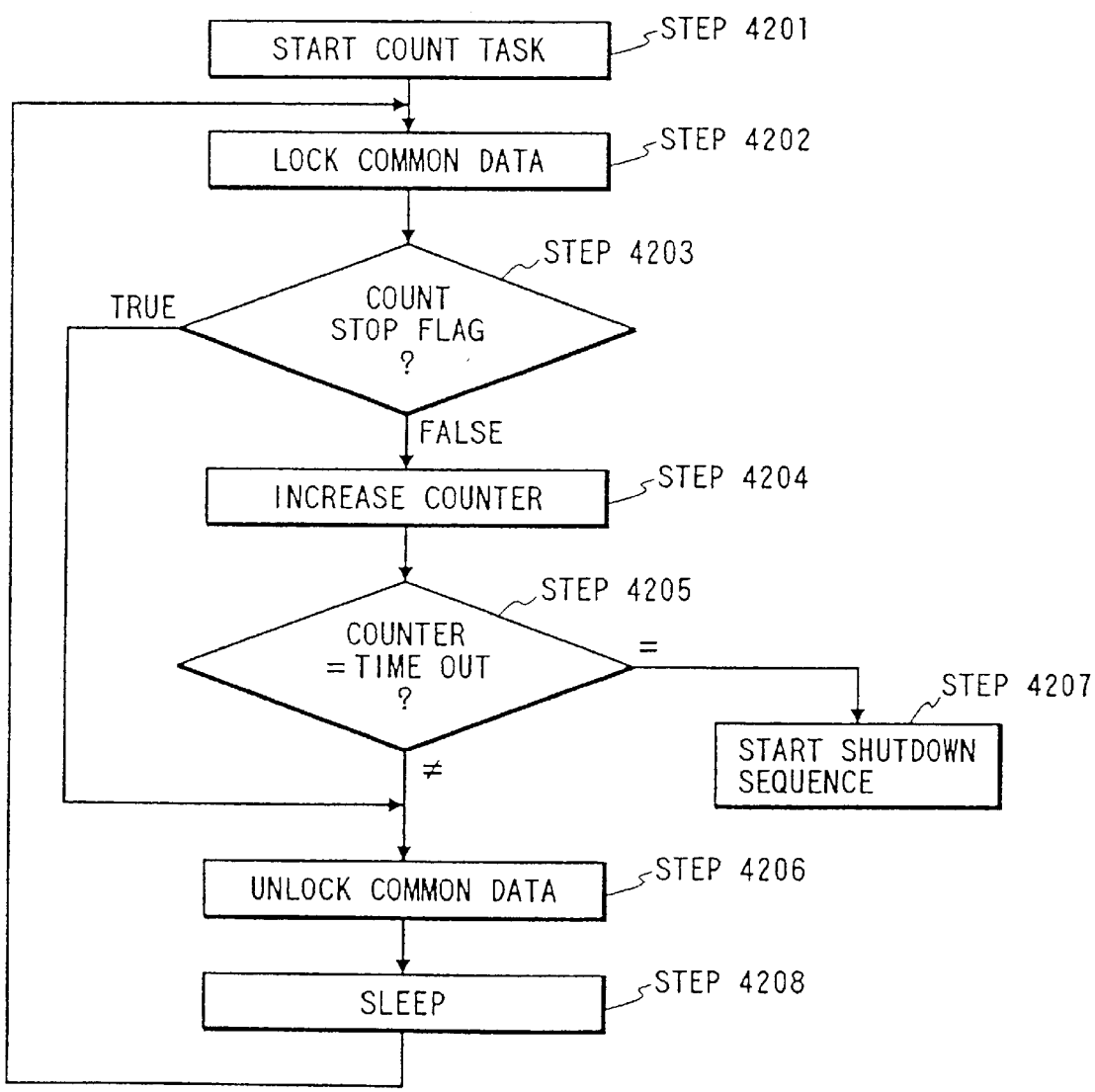
FIG. 37 is a flowchart showing the processing for a counting task for an automatic shutdown time.

FIG. 37 is a flowchart of a task for counting an automatic shutdown time. At step 4201 the task is started and at step 4202 an exclusive lock is performed for the common data. At step 4203 a count stop flag is examined. If the flag is set to TRUE, program control skips the counting operation and jumps to step 4206. If the flag is set to FALSE, at step 4204 the value held by the counter is incremented. At step 4205 the count value is compared with a set value for a timeout. When the count value matches the timeout, program control branches to step 4207. At step 4207 a shutdown sequence is activated. If at step 4205 the count value does not match the timeout, program control moves to step 4206, whereat the common data are unlocked. At step 4208 the task is set to the sleeping state for a specific period of time, and program control thereafter returns to step 4202. The processing between steps 4202 and 4208 is repeated.

<Operation of Program ROM Manager>

The operation of the program ROM manager will now be described while referring to the flowcharts.

1. Designate a module name to acquire its address

Figure 38:
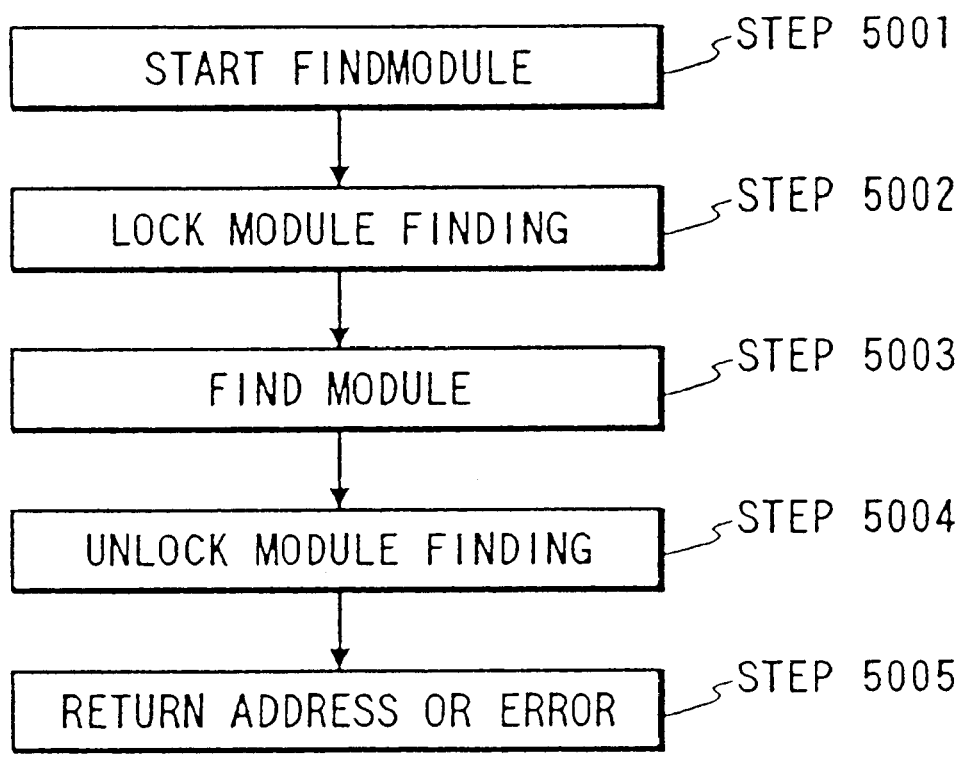
FIG. 38 is a flowchart showing the processing for FindModule.

FIG. 38 is a flowchart showing the FindModule function for acquiring a module address from a module name. At step 5001 FindModule is started, and at step 5002 an exclusive lock is performed to search for a module. The semaphore is employed for an exclusive lock. If, while the task is searching for a module, another task invalidates the module or adds a module, an operational failure will occur, so that exclusive lock is required. At step 5003 a module is searched for. The process at step 5003 will be described in detail while referring to FIG. 39. At step 5004 an exclusive lock for the module search is released. At step 5005 an address or an error value, which is a value returned at step 5003, is returned.

Figure 39:
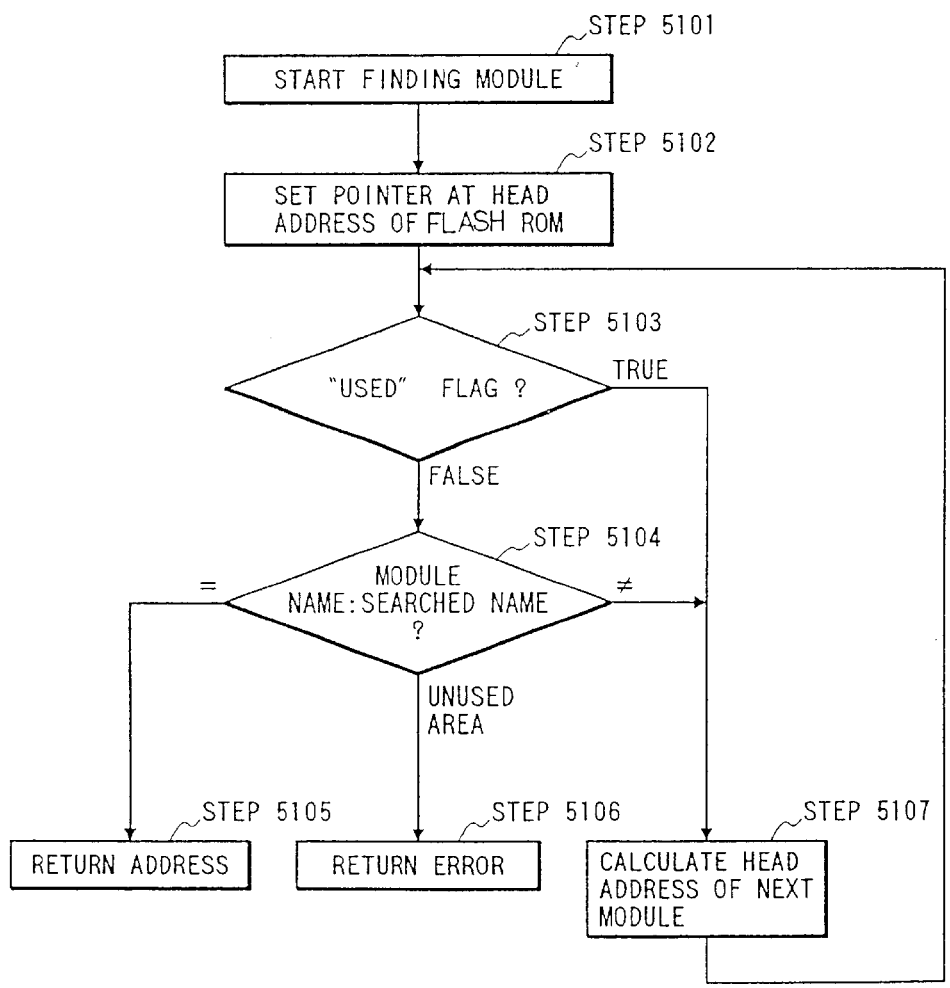
FIG. 39 is a flowchart showing module search processing.

The process at step 5003 in FIG. 38 will now be explained while referring to FIG. 39. At step 5101 the module search is begun, and at step 5102 a pointer is set to the head address for the flash ROM. As the pointer is advanced, the module is searched for. At step 5103 a use flag for a module at which the pointer points is examined. When the use flag is set to TRUE, program control branches to step 5107. When the flag is set to FALSE, program control moves to step 5104. At step 5104 a check is performed to determine whether or not the module name matches the name that was searched for and at the same time determines whether there is an unused area. If the names do not match, program control branches to step 5107. That is, when the use flag is set to TRUE or when the names do not match, the process at step 5107 is performed. At step 5107 the head address for the next module is calculated, and program control returns to step 5103. The search is continued so long as the names do not match or the use flag is set to TRUE. If, at step 5104, the names match, at step 5105 the address is returned, and program control returns to the calling source. If, at step 5104, an unused area is detected, program control branches to step 5106 and an error message is returned to the calling source.

2. Designating a file name and performing additional writing

Figure 40:
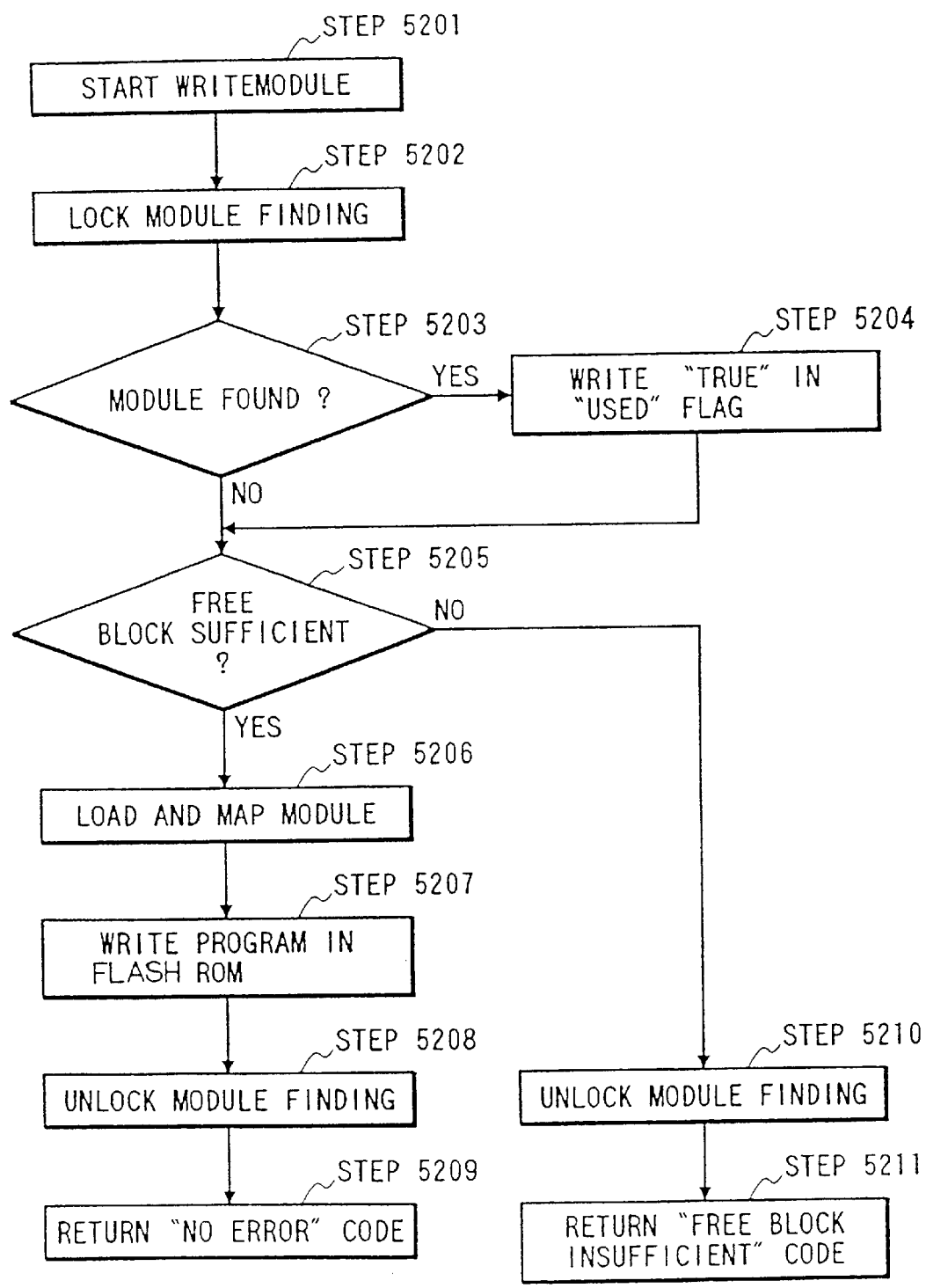
FIG. 40 is a flowchart showing the processing for WriteModule.

FIG. 40 is a flowchart for WriteModule for designating a file name for additional writing. At step 5201 WriteModule is begun and at step 5202 an exclusive lock is performed for a module search. At step 5203 the module search is performed. For the module search, the sub-routine explained while referring to FIG. 39 is employed. When a module is found, program control branches to step 5204, whereat a use flag in FIG. 7 is set to TRUE. When at step 5203 a module is not found and when the process at step 5204 is performed, program control branches to step 5205. At step 5205, an address for a free block area is searched for. Since the search for a free block area is very similar to the search for a module, no explanation for it will be given. If at step 5205 the size of the free block is insufficient, program control branches to step 5210, whereat the exclusive lock for the module search is released. At step 5211 an error message indicating that the size of the free block is insufficient is returned. When, at step 5205, a free block address is found, at step 5206 a module is loaded and mapped. Since at step 5206 an address at which a module is to be written is obtained, a program in the file is loaded into the main memory and the absolute addressing portion is rewritten to provide an actual address so that it is ready for execution. At step 5207 the program is actually written in the flash ROM. At step 5208 the exclusive lock for the module search is released, and at step 5209 code indicating there is no error is returned.

3. Designate a module name to invalidate its module

Figure 41:
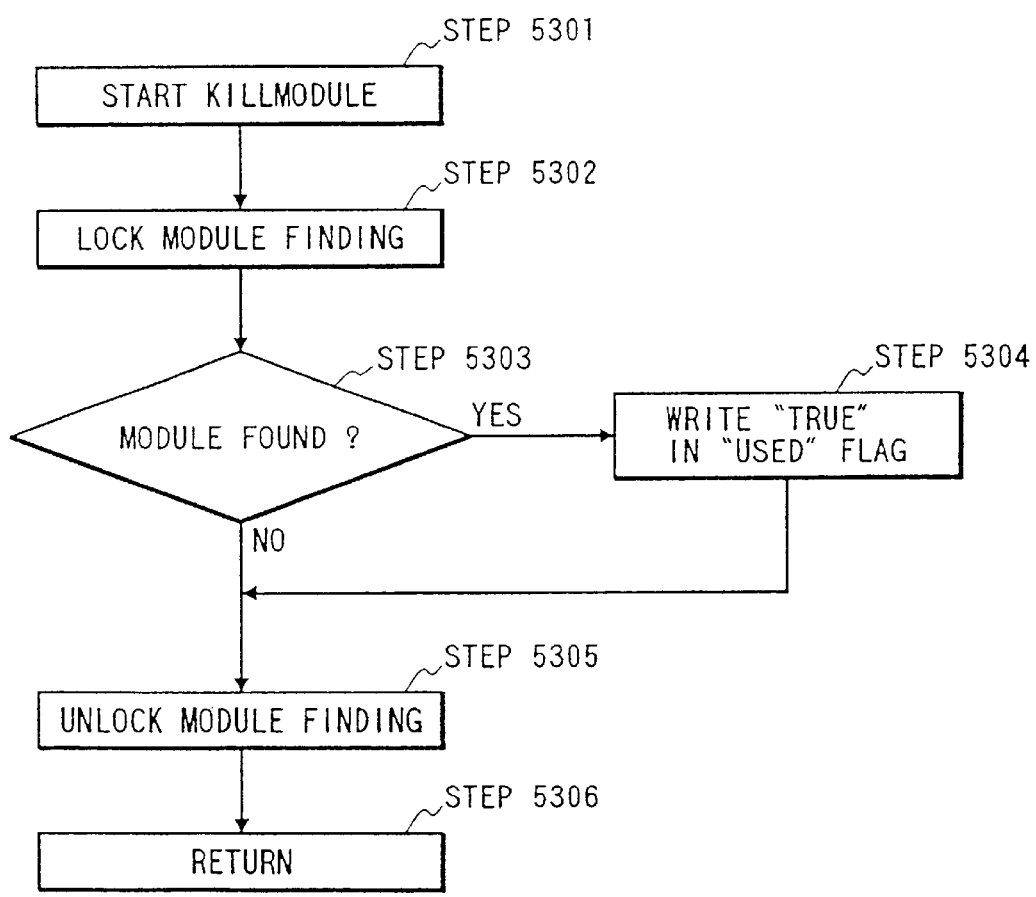
FIG. 41 is a flowchart showing the processing for KillModule.

FIG. 41 is a flowchart for the KillModule function for designating a module name for invalidating a module. At step 5301 KillModule is begun and at step 5302 an exclusive lock is performed for a module search, while at step 5303 the module search is performed. This is the routine that is explained while referring to FIG. 40. When a module is found, program control branches to step 5304, whereat a use flag (see FIG. 7) in that module is set to TRUE. When at step 5303 a module is not found and when the process at step 5304 is performed, the process at step 5305 is performed. At step 5305 the exclusive lock for the module search is released, and at step 5306 the processing is returned.

What is claimed is:

1. An information processing apparatus, which performs binding of common data between processes, said apparatus comprising:

a registration determining means for determining whether target common data is registered;

a suspension shifting means for shifting a task to a sleeping state, when said determining means determines that the target common data is not registered; and an execution shifting means for shifting a task to an executable state, when the target common data is determined to be registered by said registration determining means.

2. An information processing apparatus according to claim 1, further comprising a timing means for timing suspension of the task and to issue a timeout to return the task to an executable state, if the target common data is not registered when a predetermined time has elapsed after the task is shifted to the sleeping state.

3. An information processing apparatus according to claim 1, further comprising a locking means for locking the common data for exclusive use by the task until common data search and registration are complete.

4. An information processing method, for an information processing apparatus that performs binding of common data between processes, said method comprising:

determining whether target common data is registered;

shifting a task to a sleeping state, when it is determined in said determining step that the target common data is not registered; and shifting the task to an executable state, when the target common data is determined to be registered.

5. An information processing method according to claim 4, wherein if the target common data is not registered when a predetermined time has elapsed after the task is shifted to the sleeping state, a timeout occurs to return the to an executable state.

6. An information processing method according to claim 4, further comprising locking the common data for exclusive use by the task until common data search and registration are complete.

* * * * *

UNITED STATES PATENT AND TRADEMARK OFFICE
CERTIFICATE OF CORRECTION

PATENT NO. : 6,772,421 B2  Page 1 of 1
DATED : August 3, 2004
INVENTOR(S) : Takeshi Ogawa It is certified that error appears in the above-identified patent and that said Letters Patent is hereby corrected as shown below:

<u>Title page</u>,
Item [57], ABSTRACT,
Line 4, "is" should read -- has --.

<u>Column 7</u>,
Line 42, "amodule" should read -- a module --.

<u>Column 9</u>,
Line 26, "exists" should read -- exists. --;

<u>Column 18</u>,
Line 39, "malfinctions," should read -- malfunctions, --.

<u>Column 22</u>,
Line 61, "the to" should read -- the task to --.

Signed and Sealed this

Twenty-sixth Day of October, 2004

JON W. DUDAS
*Director of the United States Patent and Trademark Office*